United States Patent
Madan et al.

(10) Patent No.: US 10,154,415 B2
(45) Date of Patent: Dec. 11, 2018

(54) RESOURCE ADAPTATION FOR FREQUENCY DOMAIN DOWNLINK INTER-CELL INTERFERENCE COORDINATION

(71) Applicant: CISCO TECHNOLOGY, INC., San Jose, CA (US)

(72) Inventors: Ritesh K. Madan, Berkeley, CA (US); Rohit Umesh Nabar, Sunnyvale, CA (US); Vikram Chandrasekhar, Mountain View, CA (US); Kedar Durgadas Shirali, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 120 days.

(21) Appl. No.: 14/818,084

(22) Filed: Aug. 4, 2015

(65) Prior Publication Data

US 2017/0041939 A1 Feb. 9, 2017

(51) Int. Cl.
  *H04W 4/00* (2018.01)
  *H04W 16/10* (2009.01)
(52) U.S. Cl.
  CPC .................. *H04W 16/10* (2013.01)
(58) Field of Classification Search
  CPC .................................................... H04W 16/10
  USPC .................................. 370/328–330, 341–349
  See application file for complete search history.

(56) References Cited

U.S. PATENT DOCUMENTS

| | | | |
|---|---|---|---|
| 6,141,565 A | 10/2000 | Feuerstein et al. | |
| 6,600,924 B1 | 7/2003 | Sinivaara | |
| 6,771,934 B2 | 8/2004 | Demers | |
| 7,151,937 B2 | 12/2006 | Jin et al. | |
| 7,379,739 B2 | 5/2008 | Rajkotia et al. | |
| 7,884,763 B2 | 2/2011 | Na et al. | |
| 7,974,652 B2 | 7/2011 | Gerlach | |
| 7,983,667 B2 | 7/2011 | Hart et al. | |
| 8,045,996 B2 | 10/2011 | Brunner et al. | |
| 8,078,185 B2 * | 12/2011 | Sun | H04W 16/10 370/260 |

(Continued)

FOREIGN PATENT DOCUMENTS

EP  2566261  3/2013

OTHER PUBLICATIONS

U.S. Appl. No. 15/089,252, filed Apr. 1, 2016, entitled "Method and System for Dynamic Allocation of Resources in a Cellular Network."

(Continued)

*Primary Examiner* — Thai D Hoang
(74) *Attorney, Agent, or Firm* — Patterson + Sheridan, LLP

(57) ABSTRACT

An example method is provided in one example embodiment and includes receiving at least one performance metric from each of a plurality of cells, the at least performance metric associated with a downlink transmission from the cell to one or more user equipment devices associated with the cell. The method further includes determining a fraction of resources for allocation within a fractional frequency reuse portion of a frequency spectrum based upon the received at least one performance metric, and determining a fraction of the resources for allocation within a reuse one portion of the frequency spectrum based upon the determined fraction of resources for allocation within the fractional frequency reuse portion of the frequency spectrum.

18 Claims, 12 Drawing Sheets

(56) References Cited

U.S. PATENT DOCUMENTS

| | | | |
|---|---|---|---|
| 8,107,950 B2 | 1/2012 | Amerijoo et al. | |
| 8,126,495 B2 | 2/2012 | Wu | |
| 8,145,223 B2 | 3/2012 | Guey | |
| 8,145,252 B2 | 3/2012 | Sung et al. | |
| 8,170,544 B1 | 5/2012 | Satapathy et al. | |
| 8,194,630 B2 | 6/2012 | Qvarfordt | |
| 8,208,937 B2 | 6/2012 | Zhang | |
| 8,229,451 B2 | 7/2012 | Frenger et al. | |
| 8,270,976 B2 | 9/2012 | Simonsson et al. | |
| 8,275,376 B2 | 9/2012 | Vikberg | |
| 8,320,965 B2 | 11/2012 | Kwun | |
| 8,340,711 B1 | 12/2012 | Glass et al. | |
| 8,400,921 B2 | 3/2013 | Grayson et al. | |
| 8,483,743 B2 | 7/2013 | Dimou | |
| 8,538,337 B2 | 9/2013 | Damnjanovic | |
| 8,588,698 B2 | 11/2013 | Brisebois | |
| 8,611,299 B2 | 12/2013 | Yang et al. | |
| 8,619,563 B2 | 12/2013 | Madan et al. | |
| 8,639,243 B2 | 1/2014 | Radulescu et al. | |
| 8,687,585 B2 | 4/2014 | Marks et al. | |
| 8,694,044 B2 | 4/2014 | Hiltunen et al. | |
| 8,712,459 B2 | 4/2014 | Lim et al. | |
| 8,731,567 B2 | 5/2014 | Zhang | |
| 8,743,772 B2 | 6/2014 | Garavaglia et al. | |
| 8,755,791 B2 | 6/2014 | Bontu et al. | |
| 8,761,826 B2 | 6/2014 | Brown et al. | |
| 8,792,886 B2 | 7/2014 | Meshkati | |
| 8,797,983 B2 | 8/2014 | Sun | |
| 8,805,373 B2 | 8/2014 | Chayat | |
| 8,805,385 B2* | 8/2014 | Hunukumbure | H04W 36/22 455/436 |
| 8,830,936 B2 | 9/2014 | Ren | |
| 8,838,125 B2 | 9/2014 | Dalsgaard et al. | |
| 8,854,998 B2 | 10/2014 | Johansson et al. | |
| 8,862,134 B1 | 10/2014 | Zhou | |
| 8,874,126 B2 | 10/2014 | Jeong et al. | |
| 8,879,441 B2 | 11/2014 | Hunukumbure | |
| 8,983,470 B1 | 3/2015 | Ryan | |
| 9,014,004 B2 | 4/2015 | Nuss et al. | |
| 9,031,591 B2 | 5/2015 | Ma et al. | |
| 9,143,995 B2 | 9/2015 | Oknnyanskiy et al. | |
| 9,148,838 B2 | 9/2015 | Yanover et al. | |
| 9,167,444 B2 | 10/2015 | Nuss et al. | |
| 9,197,358 B2 | 11/2015 | Hejazi | |
| 9,219,816 B2 | 12/2015 | Grayson | |
| 9,313,004 B2 | 4/2016 | Yanover et al. | |
| 9,332,458 B2 | 5/2016 | Nuss et al. | |
| 9,344,970 B2 | 5/2016 | Uplenchwar et al. | |
| 9,414,310 B2 | 8/2016 | Grayson | |
| 9,490,953 B2 | 11/2016 | Yanover et al. | |
| 9,497,708 B2 | 11/2016 | Uplenchwar et al. | |
| 9,544,857 B2 | 1/2017 | Carter et al. | |
| 9,867,064 B2* | 1/2018 | Chandrasekhar | H04W 24/02 |
| 2002/0061742 A1 | 5/2002 | Lapaille | |
| 2004/0085909 A1 | 5/2004 | Soliman | |
| 2004/0213170 A1 | 10/2004 | Bremer | |
| 2005/0064820 A1 | 3/2005 | Park et al. | |
| 2005/0215251 A1 | 9/2005 | Krishnan | |
| 2005/0282572 A1 | 12/2005 | Wigard et al. | |
| 2006/0068712 A1 | 3/2006 | Kroboth et al. | |
| 2006/0073791 A1 | 4/2006 | Senarath | |
| 2006/0229087 A1 | 10/2006 | Davis et al. | |
| 2006/0292989 A1 | 12/2006 | Gerlach | |
| 2007/0008885 A1 | 1/2007 | Bonner | |
| 2007/0086406 A1* | 4/2007 | Papasakellariou | H04W 16/04 370/343 |
| 2007/0177501 A1* | 8/2007 | Papasakellariou | H04W 24/00 370/229 |
| 2007/0253372 A1 | 11/2007 | Nakayasu | |
| 2007/0280170 A1 | 12/2007 | Kawasaki | |
| 2008/0004028 A1 | 1/2008 | Vincent | |
| 2008/0043623 A1 | 2/2008 | Franceschini | |
| 2008/0084844 A1 | 4/2008 | Reznik | |
| 2008/0107074 A1 | 5/2008 | Salmenkaita et al. | |
| 2008/0139197 A1 | 6/2008 | Misra et al. | |
| 2008/0188265 A1 | 8/2008 | Carter et al. | |
| 2008/0268833 A1 | 10/2008 | Huang | |
| 2009/0054047 A1 | 2/2009 | Kylvaja | |
| 2009/0092088 A1 | 4/2009 | Kokku | |
| 2009/0129284 A1 | 5/2009 | Jung et al. | |
| 2009/0129291 A1 | 5/2009 | Gupta | |
| 2009/0232074 A1 | 9/2009 | Yang et al. | |
| 2009/0323530 A1 | 12/2009 | Trigui et al. | |
| 2010/0009634 A1 | 1/2010 | Budianu | |
| 2010/0029282 A1 | 2/2010 | Stamoulis et al. | |
| 2010/0034157 A1 | 2/2010 | Stolyar et al. | |
| 2010/0056184 A1 | 3/2010 | Vakil | |
| 2010/0093358 A1 | 4/2010 | Cheong et al. | |
| 2010/0099424 A1 | 4/2010 | Centonza | |
| 2010/0110989 A1 | 5/2010 | Wu | |
| 2010/0112982 A1 | 5/2010 | Singh et al. | |
| 2010/0124930 A1 | 5/2010 | Andrews | |
| 2010/0177722 A1 | 7/2010 | Guvenc | |
| 2010/0227611 A1 | 9/2010 | Schmidt et al. | |
| 2010/0233962 A1 | 9/2010 | Johansson | |
| 2010/0240314 A1 | 9/2010 | Chang | |
| 2010/0260036 A1 | 10/2010 | Molnar et al. | |
| 2010/0260068 A1 | 10/2010 | Bhatt et al. | |
| 2010/0267408 A1 | 10/2010 | Lee et al. | |
| 2010/0275083 A1 | 10/2010 | Nam et al. | |
| 2010/0279628 A1 | 11/2010 | Love et al. | |
| 2010/0285795 A1 | 11/2010 | Whinnett | |
| 2010/0309864 A1 | 12/2010 | Tamaki | |
| 2010/0311449 A1 | 12/2010 | Whinnett | |
| 2010/0317351 A1 | 12/2010 | Gerstenberger | |
| 2010/0322109 A1* | 12/2010 | Ahn | H04L 5/0062 370/254 |
| 2011/0039539 A1 | 2/2011 | Maida et al. | |
| 2011/0039570 A1 | 2/2011 | Maida et al. | |
| 2011/0070911 A1* | 3/2011 | Zhang | H04W 16/02 455/509 |
| 2011/0077016 A1 | 3/2011 | Stolyar et al. | |
| 2011/0086614 A1 | 4/2011 | Brisebois | |
| 2011/0092209 A1* | 4/2011 | Gaal | H04W 16/12 455/436 |
| 2011/0110316 A1 | 5/2011 | Chen et al. | |
| 2011/0128862 A1 | 6/2011 | Kallin | |
| 2011/0136478 A1 | 6/2011 | Trigui | |
| 2011/0151877 A1 | 6/2011 | Tafreshi | |
| 2011/0176497 A1* | 7/2011 | Gopalakrishnan | H04J 11/0053 370/329 |
| 2011/0182375 A1 | 7/2011 | Kim et al. | |
| 2011/0188441 A1* | 8/2011 | Kim | H04L 5/0044 370/312 |
| 2011/0195730 A1 | 8/2011 | Chami | |
| 2011/0195732 A1* | 8/2011 | Kim | H04W 16/02 455/509 |
| 2012/0157155 A1* | 6/2012 | Cho | H04W 52/54 455/522 |
| 2013/0107798 A1 | 5/2013 | Gao et al. | |
| 2013/0137447 A1 | 5/2013 | Zhang et al. | |
| 2014/0220990 A1 | 8/2014 | Lorca Hernando | |
| 2014/0233468 A1* | 8/2014 | Hejazi | H04L 1/00 370/329 |
| 2014/0269355 A1 | 9/2014 | Monogioudis et al. | |
| 2015/0011229 A1 | 1/2015 | Morita et al. | |
| 2015/0365855 A1 | 12/2015 | Nuss et al. | |
| 2015/0373698 A1 | 12/2015 | Uplenchwar et al. | |
| 2015/0382367 A1 | 12/2015 | Yanover et al. | |
| 2016/0073426 A1 | 3/2016 | Bull et al. | |
| 2016/0127069 A1 | 5/2016 | Nuss et al. | |
| 2016/0373202 A1 | 12/2016 | Nuss et al. | |
| 2017/0034795 A1* | 2/2017 | Madan | H04W 72/0453 |

OTHER PUBLICATIONS

U.S. Appl. No. 14/479,343, filed Sep. 7, 2014, entitled "Operation of Base Station in a Celllular Communication Network," Inventor: Simon Burley.

U.S. Appl. No. 15/015,691, filed Feb. 4, 2016, entitled "System and Method for Optimizing Performance of a Communication Network," Inventor(s): Ziv Nuss, et al.

(56) References Cited

OTHER PUBLICATIONS

U.S. Appl. No. 14/679,868, filed Apr. 6, 2015, entitled "System and Method for Managing Interference in a Network Environment Based on User Presence," Inventors: Mark Grayson, et al.
U.S. Appl. No. 14/687,198, filed Apr. 15, 2015, entitled "System and Method for Managing Interference in a Network Environment Based on User Presence," Inventors: Mark Grayson, et al.
U.S. Appl. No. 14/686,598, filed Apr. 14, 2015, entitled "System and Method for Providing Uplink Inter Cell Interference Coordination in a Network Environment," Inventors: Ritesh K. Madan, et al.
U.S. Appl. No. 14/691,260, filed Apr. 20, 2015, entitled "System and Method for Providing Uplink Inter Cell Interference Coordination in a Network Environment," Inventors: Ritesh K. Madan, et al.
U.S. Appl. No. 14/809,201, filed Jul. 25, 2015, entitled "System and Method to Facilitate Small Cell Uplink Power Control in a Network Environment," Inventors: Ritesh K. Madan, et al.
U.S. Appl. No. 14/833,519, filed Aug. 24, 2015, entitled "System and Method to Facilitate Small Cell Uplink Powercontrol in a Network Environment," Inventors: Ritesh K. Madan, et al.
U.S. Appl. No. 14/918,420, filed Oct. 20, 2015, entitled "System and Method for Frequency and Time Domain Downlink Inter-Cell Interference Coordination," Inventors: Ritesh K. Madan, et al.
U.S. Appl. No. 14/951,987, filed Nov. 25, 2015, entitled "System and Method for Frequency and Time Domain Downlink Inter-Cell Interference Coordination," Inventors: Ritesh K. Madan, et al.
U.S. Appl. No. 14/852,210, filed Sep. 11, 2015, entitled "System and Method for Providing Dynamic Radio Access Network Orchestration," Inventors: Virginia Rosa de Sousa Teixeira, et al.
U.S. Appl. No. 14/961,552, filed Dec. 7, 2015, entitled "System and Method to Provide Uplink Interference Coordination in a Network Environment," Inventor: Ritesh K. Madan.
U.S. Appl. No. 14/993,859, filed Jan. 12, 2016, entitled "System and Method to Facilitate Centralized Radio Resource Management in a Split Radio Access Network Environment," Inventor: Ritesh K. Madan.
U.S. Appl. No. 15/002,187, filed Jan. 20, 2016, entitled "System and Method to Provide Small Cell Power Control and Load Balancing for High Mobility User Equipment in a Network Environment," Inventor: Ritesh K. Madan.
U.S. Appl. No. 15/013,844, filed Feb. 2, 2016, entitled "System and Method to Facilitate Subframe Scheduling in a Split Medium Access Control Radio Access Network Environment," Inventor: Ian Neville Bendle, et al.
U.S. Appl. No. 15/018,677, filed Febuary 8, 2016, entitled "Mitigation of Uplink Interference Within Heterogeneous Wireless Communications Networks," Inventor: Pankaj Uplenchwar, et al.
U.S. Appl. No. 14/801,381, filed Jul. 16, 2015, entitled "System and Method to Manage Network Utilization According to Wireless Backhaul and Radio Access Network Conditions," Inventor: Ishwardutt Parulkar.
U.S. Appl. No. 15/251,471, filed Aug. 30, 2016, entitled "Method and Apparatus For Reducing Inter-Cell Interference," Inventor: Ziv Nuss, et al.
EPO Nov. 21, 2016 Extended Search Report and Written Opinion from European Application Serial No. 16180195.6; 9 pages.
Liu, Jianquo, et al., "Uplink Power Control and Interference Foordination for Heterogeneous Network," 2012 IEEE 23rd International Symposium on Personal, Indoor and mobile Radio Communications, Sydney, Australia, Sep. 9-12, 2012; 5 pages.
U.S. Appl. No. 14/848,026, filed Sep. 8, 2015 entitled "Serving Noise/Macro Interference Limited User Equipment for Downlink Inter-Cell Interference Coordination," Inventors: Ritesh K. Madan et al.
U.S. Appl. No. 14/811,580, filed Jul. 28, 2015 entitled "Determining Fractional Frequency Reuse Power Levels for Downlink Transmissions," Inventor: Ritesh K. Madan.
U.S. Appl. No. 14/816,957, filed Aug. 3, 2015 entitled "Selecting Cells for Downlink Inter-Cell Interference Coordination," Inventors: Rohit U. Nabar et al.
U.S. Appl. No. 14/816,990, filed Aug. 3, 2015 entitled "User Equipment Power Level Selection for Downlink Transmissions," Inventors: Vikram Chandrasekhar et al.

\* cited by examiner

RESOURCE ADAPTATION FOR FREQUENCY DOMAIN DOWNLINK INTER-CELL INTERFERENCE COORDINATION

TECHNICAL FIELD

This disclosure relates in general to the field of communications and, more particularly, to resource adaptation for frequency domain downlink inter-cell interference coordination (ICIC).

BACKGROUND

Long Term Evolution (LTE) networks often employ fractional frequency reuse (FFR) schemes in order to optimally allocate frequencies within a cellular network. FFR partitions a cell's (e.g. an LTE eNodeB) bandwidth among user equipment within the network such that cell-edge users of adjacent cells do not interfere with each other and interference received by cell interior users is reduced. The use of FFR in a cellular network is a tradeoff between improvement in rate and coverage for cell edge users, and sum network throughput and spectral efficiency for the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which:

FIG. 10 illustrates a simplified flow diagram illustrating example operations associated with downlink inter-cell interference management using cell specific feedback in accordance with another embodiment;

DETAILED DESCRIPTION OF EXAMPLE EMBODIMENTS

Overview

Figure 1:
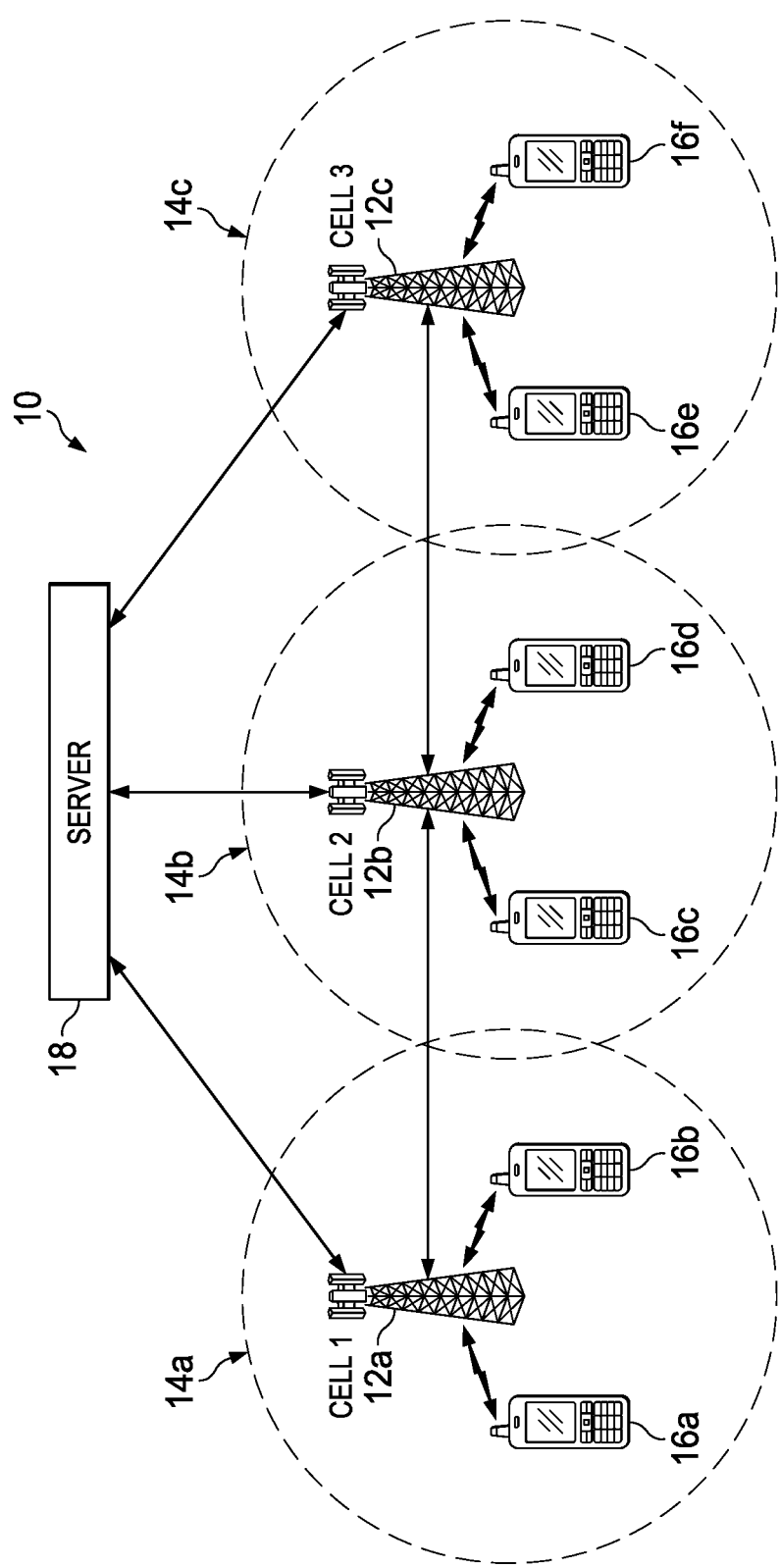
FIG. 1 is a simplified block diagram of a communication system for resource allocation in a fractional frequency reuse (FFR) cellular network in accordance with one embodiment of the present disclosure.

A method according to one embodiment includes receiving at least one performance metric from each of a plurality of cells, the at least performance metric associated with a downlink transmission from the cell to one or more user equipment devices associated with the cell. The method further includes determining a fraction of resources for allocation within a fractional frequency reuse portion of a frequency spectrum based upon the received at least one performance metric, and determining a fraction of the resources for allocation within a reuse one portion of the frequency spectrum based upon the determined fraction of resources for allocation within the fractional frequency reuse portion of the frequency spectrum.

In a particular embodiment, the method further includes sending resource allocation parameters including an including an indication of the fraction of resources for allocation within the fractional frequency reuse portion of the frequency spectrum and an indication of the fraction of resources for allocation within the reuse one portion of the frequency spectrum to each of the plurality of cells.

In another particular embodiment, the at least one performance metric includes an effective rate representative of an overall throughput performance for all user equipment devices associated with the particular cell for different fraction values of resource allocation for the fractional frequency reuse portion of the spectrum. In still another particular embodiment, determining the fraction of resources for allocation within the fractional frequency reuse portion of the spectrum includes maximizing a sum of utilities across the plurality of cells. In still another particular embodiment, maximizing the sum of utilities includes solving a utility maximization resource allocation function across the plurality of cells to determine the fraction of resources for allocation within the fractional frequency reuse portion of a frequency spectrum and the fraction of the resources for allocation within the reuse one portion of the frequency spectrum.

In still another particular embodiment, the at least one performance metric includes at least one of a spectral efficiency and average modulation and coding scheme (MCS) for each user equipment device associated with a cell. In another particular embodiment, determining the fraction of resources for allocation within the fractional frequency reuse portion of the frequency spectrum includes solving a utility maximization resource allocation function across the plurality of cells using at least one of the spectral efficiency and average modulation and coding scheme (MCS).

In another particular embodiment, the at least one performance metric includes an effective rate computed by the particular cell based upon performance metrics received from each user equipment device associated with the cell. In still another particular embodiment, the at least one performance metric includes a number of user equipment devices served by the particular cell that have a performance measure metric in the reuse one portion of the frequency spectrum below a target threshold value, and a total number of user equipment devices served by the particular cell.

In another particular embodiment, determining the fraction of resources for allocation within the fractional frequency reuse portion of the frequency spectrum includes adapting the fraction of resources such that a predefined percentile of downlink transmission to the UEs occur at a predefined performance metric threshold. In still another particular embodiment, the performance measure metric includes at least one of a signal-to-interference-plus-noise ratio (SINR) and average modulation and coding scheme (MCS).

One or more non-transitory tangible media according to one embodiment includes code for execution and when executed by a processor operable to perform operations including receiving at least one performance metric from each of a plurality of cells, the at least performance metric associated with a downlink transmission from the cell to one or more user equipment devices associated with the cell. The operations further include determining a fraction of resources for allocation within a fractional frequency reuse portion of a frequency spectrum based upon the received at least one performance metric, and determining a fraction of the resources for allocation within a reuse one portion of the frequency spectrum based upon the determined fraction of resources for allocation within the fractional frequency reuse portion of the frequency spectrum.

An apparatus according to one embodiment includes a memory element configured to store data, a processor operable to execute instructions associated with the data, and at least one module being configured to receive at least one performance metric from each of a plurality of cells, the at least performance metric associated with a downlink transmission from the cell to one or more user equipment devices associated with the cell. The at least one module is further configured to determine a fraction of resources for allocation within a fractional frequency reuse portion of a frequency spectrum based upon the received at least one performance metric, and determine a fraction of the resources for allocation within a reuse one portion of the frequency spectrum based upon the determined fraction of resources for allocation within the fractional frequency reuse portion of the frequency spectrum.

EXAMPLE EMBODIMENTS

Referring now to FIG. 1, FIG. 1 is a simplified block diagram of a communication system 10 for resource allocation in a fractional frequency reuse (FFR) cellular network in accordance with one embodiment of the present disclosure. Communication system 10 of FIG. 1 includes a first cell (Cell 1) 12a having a first coverage area 14a, a second cell (Cell 2) 12b having a second coverage area 14b, and a third cell (Cell 3) 12c having a third coverage area 14c. In accordance with one or more embodiments, first cell 12a, second cell 12b, and third cell 12c are each a long term evolution (LTE) evolved Node B (eNodeB). In other embodiments, first cell 12a, second cell 12b, and third cell 12c may be any suitable base station. First coverage area 14a, second coverage area 14b, and third coverage area 14c are representative of a geographic area for which first cell 12a, second cell 12b, and third cell 12c, respectively, can effectively provide service to a user equipment device therein.

First cell 12a includes a first user equipment (UE) device 16a and a second user equipment (UE) device 16b located within first coverage area 14a and served by first cell 12a. Second cell 12b includes a third user equipment (UE) device 16c and a fourth user equipment (UE) device 16d located within second coverage area 14b and served by second cell 12b. Third cell 12c includes a fifth user equipment (UE) device 16e and a sixth user equipment (UE) device 16f located within third coverage area 14c and served by third cell 12c. In one or more embodiments, first cell 12a, second cell 12b, and third cell 12c allocate resources within their respective coverage areas 14a-14c using fractional frequency reuse (FFR) as will be further described herein.

In at least one embodiment, each of first UE 16a, second UE 16b, third UE 16c, fourth UE 16d, fifth UE 16e, and sixth UE 16f is a mobile device having the ability to communicate with and handover between one or more of first cell 12a, second cell 12b, and third cell 12c using one or more mobile wireless connections. In accordance with various embodiments, one or more of UEs 16a-16f may include a computer (e.g., notebook computer, laptop, tablet computer or device), a tablet, a cell phone, a personal digital assistant (PDA), a smartphone, or any other suitable device having the capability to communicate using wireless access technologies with one or more of first cell 12a, second cell 12b, and third cell 12c.

In the embodiment illustrated in FIG. 1, first cell 12a, second cell 12b, and third cell 12c are in communication with one another. Communication system 10 further includes a server 18 in communication with each of first cell 12a, second cell 12b, and third cell 12c. In one or more embodiments, server 18 is located in an evolved packet core (EPC) network which may include one or more of a serving GPRS support node (SGSN)/mobile management entity (MME), a home subscriber server (HSS), a serving gateway (SGW), a packet data network (PDN) gateway (PGW), a policy and charging rules function (PCRF), and one or more packet networks. In accordance with various embodiments, server 18 is configured to receive feedback from each of first cell 12a, second cell 12b, and third cell 12c, and determine how resources should be allocated between first cell 12a, second cell 12b, and third cell 12c based upon the feedback.

In one or more embodiments, server 18 is further configured to provide resource allocation parameters to first cell 12a, second cell 12b, and third cell 12c. In one or more embodiments, the resource allocation parameters provided to first cell 12a, second cell 12b, and third cell 12c are used to optimize resources allocated among first cell 12a, second cell 12b, and third cell 12c used to serve the UEs within their respective coverage areas 14a-14c. In particular embodiments, the resource allocation parameters include parameters related to allocation of fractional frequency reuse (FFR) resources.

Before detailing some of the operational aspects of FIG. 1, it is important to understand different scenarios involving location of user equipment in a mobile network. The following foundation is offered earnestly for teaching purposes only and, therefore should not be construed in any way to limit the broad teachings of the present disclosure. The basic idea of FFR is to partition the cell's bandwidth so that (i) cell-edge users of adjacent cells do not interfere with each other and (ii) interference received by (and created by) cell interior users is reduced, while (iii) using more total spectrum than classical frequency reuse. The use of FFR in cellular network is a tradeoff between improvement in rate and coverage for cell edge users, and sum network throughput and spectral efficiency. FFR is a compromise between hard and soft frequency reuse. Hard frequency reuse splits the system bandwidth into a number of distinct sub bands according to a chosen reuse factor and allows neighbor cells to transmit on different sub bands. FFR splits the given bandwidth into an inner and outer portions. FFR allocates an inner portion to the UEs located near to the eNodeB in terms of path loss with reduced power applying frequency reuse factor of one, i.e. the inner portion is completely reused by all eNodeBs. For the UEs close to the cell edge, a fraction of the outer portion of the bandwidth is dedicated with a frequency reuse factor greater than one. With soft frequency reuse the overall bandwidth is shared by all eNodeBs (i.e., a reuse factor of one is applied) but for the transmission on each sub-carrier, the eNBs are restricted to a particular power bound.

There are two common FFR models: strict FFR and Soft Frequency Reuse (SFR). Strict FFR is a modification of the traditional frequency reuse in which exterior frequency subbands are not shared with the inner frequency bands. Soft Frequency Reuse (SFR) employs the same cell-edge bandwidth partitioning strategy as Strict FFR, but the interior UEs are allowed to share subbands with edge UEs in other cells. Accordingly, shared subbands by interior UEs users are transmitted at lower power levels than for the cell edge UEs. SFR is more bandwidth efficient than strict FFR, but results in more interference to both cell-interior and edge UEs.

Figure 2A:
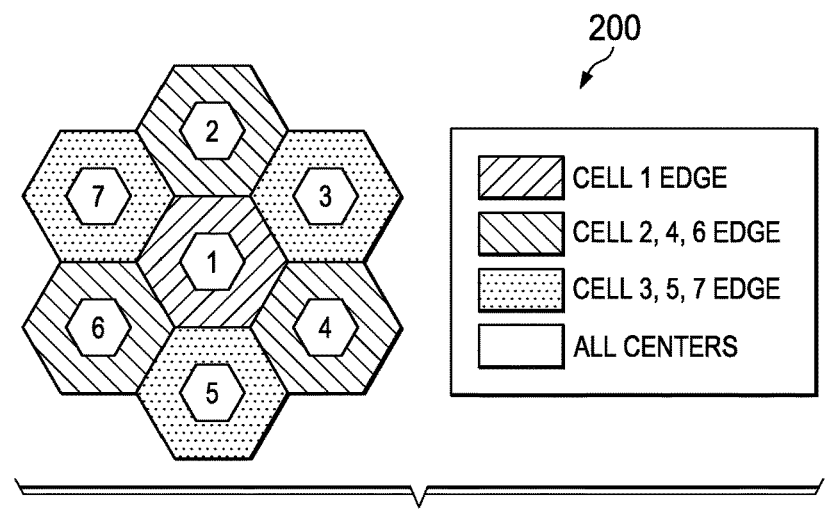
FIGS. 2A-2B illustrate an example of bandwidth allocation using fractional frequency reuse for a number of cells.
Figure 2B:
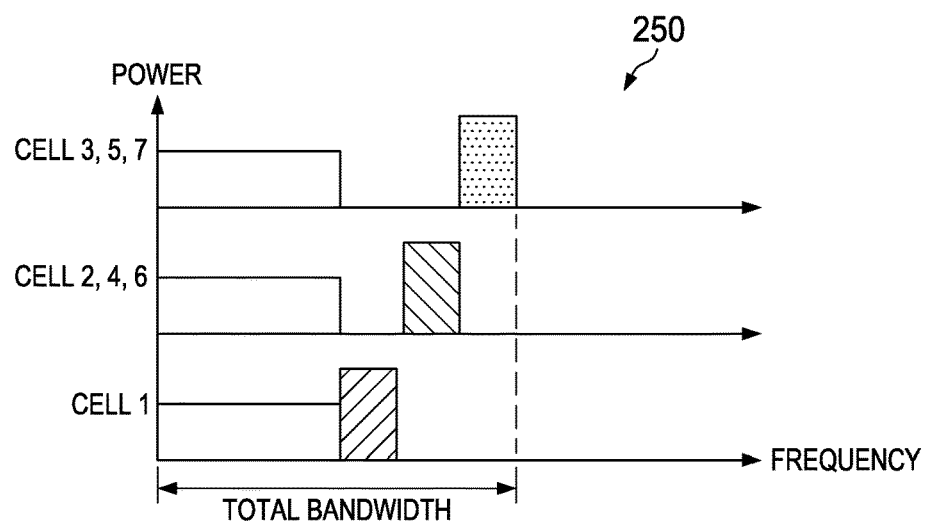

FIGS. 2A-2B illustrate an example of bandwidth allocation using fractional frequency reuse for a number of cells. In the example of FIGS. 2A-2B, seven cells are arranged in a hexagonal configuration 200 with Cell 1 in the center and surround by Cells 2-7 numbered in a clockwise pattern in which strict FFR for reuse 3 is employed at cell edge UEs. In the example illustrated in FIGS. 2A-2B a power allocation scheme 250 is shown in which the inner portion of each of cells 1-8 is allocated a first frequency portion of the total frequency bandwidth at a particular power level P1. The edges of cell 1 are allocated a second portion of the total bandwidth at a power level P2, the edges of cells 2, 4, and 6 are allocated a third portion of the total bandwidth at a power level P3, and the edges of cells 3, 5, and 7 area allocated a fourth portion of the total bandwidth at a power level P4.

Figure 3:
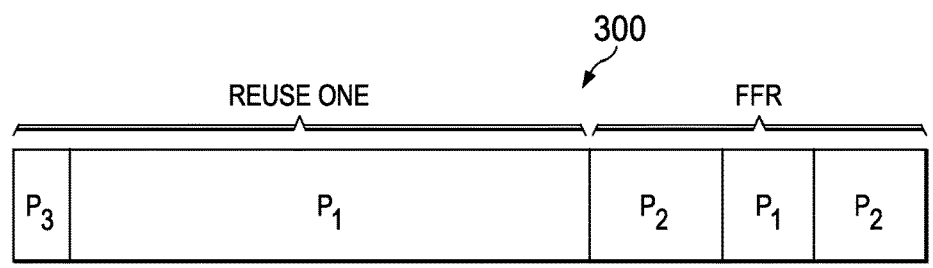
FIG. 3 is a simplified diagram of an example of resource block power allocation for the communication system of FIG. 1 in accordance with one embodiment.

Referring now to FIG. 3, FIG. 3 is a simplified diagram of an example of resource block power allocation 300 for communication system 10 of FIG. 1 in accordance with one embodiment. To overcome the effect of multipath fading problem present in Universal Mobile Telecommunications System (UMTS), LTE uses Orthogonal Frequency Division Multiplexing (OFDM) for downlink from the base station to the UE to transmit the data over many narrow band carriers of 180 KHz each instead of spreading one signal over the complete 5 MHz career bandwidth. Accordingly, OFDM uses a large number of narrow sub-carriers for multi-carrier transmission to carry data. Orthogonal frequency-division multiplexing (OFDM), is a frequency-division multiplexing (FDM) scheme used as a digital multi-carrier modulation method and meets the LTE requirement for spectrum flexibility and enables cost-efficient solutions for very wide carriers with high peak rates. The basic LTE downlink physical resource can be seen as a time-frequency grid in which the OFDM symbols are grouped into resource blocks. In LTE, the resource blocks have a total size of 180 kHz in the frequency domain and 0.5 ms in the time domain. A resource element (RE) is the smallest defined unit which consists of one OFDM sub-carrier during one OFDM symbol interval. Each resource block (RB) consists of 12·7=84 resource elements in case of normal cyclic prefix (72 for extended CP). Each UE is allocated a number of the resource blocks in the time frequency grid. The more resource blocks a UE is allocated, and the higher the modulation used in the resource elements, the higher the bit-rate. Which resource blocks and how many the UE is allocated at a given point in time depends upon frequency and time scheduling mechanisms.

FIG. 3 illustrates frequency domain power variation across multiple cells to mitigate interference between the cells. In the reuse portion there are a number of resource blocks (RBs) in which all the cells on the downlink use the same amount of transmit power per RB. As described above, a RB is an allocated portion of time and frequency spectrum used for downlink transmission from the cell to one or more UEs. If there was no interference, management in every cell would transmit at the same power across all the resources, and the interference a UE would experience on the downlink would be same across frequency from all of the cells if they were all fully loaded.

In the embodiment of FIG. 3, three different power levels ($P_1$, $P_2$, and $P_3$) for resource blocks (RBs) are illustrated in which $P_3 >= P_1 > P_2$. In the illustrated embodiment, $P_1$ is the power level used by all cells in the reuse one portion of the spectrum. In the reuse one portion every cell reuses that portion of the spectrum and uses the same transmission power across the spectrum. In the FFR portion of the spectrum, a given cell transmits at a higher power on the $P_1$ portion of the FFR, and lowers its power per RB on the rest of the RBs in that part of the frequency, which is $P_2$. If a given cell increases its power $P_1$ in the FFR portion of the spectrum, then a neighboring cell will reduce its power in the same portion but will have a higher power of transmission on $P_2$. Accordingly in the FFR portion, one cell may increase its power on one part of the FFR spectrum and neighboring cells may reduce their power on the same part of the FFR spectrum. Typically, the FFR portion is used to serve mobiles UEs located close to a coverage area between, for example, within the coverage area 14a of cell 1 (12a) but close to the coverage area 14b of cell 2 (12b). The cost is that the number of resources to serve UEs are reduced because the opposite must be performed on the other part of the spectrum. However, UE's at the boundary of two cells will still gain an increase in performance because the signal-to-noise ratio (SNR) increases even though resources are reduced. Accordingly, the net change in capacity is positive for UEs near the edge of a cell.

One or more embodiments described herein are directed to determining a number of resource blocks (RBs) to be allocated in a reuse one portion and a number of resource blocks (RBs) to be allocated in the fractional frequency resource (FFR) portion for a given set of power levels based upon information collected from the cells in a centralized manner. In one example allocation, if more UEs are located near a cell edge, it is desired to allocate more resources in the FFR portion. In another example allocation, if more of the UEs are close to the cells that serve them, it is desired to allocate more resources in the reuse one portion.

Referring again to FIG. 1, in one embodiment each of cells 12a-12c collect information obtained from one or more UEs, such as path loss or interference information, and provide feedback regarding the collected information to server 18. In at least one embodiment, server 18 then computes resource allocation parameters including one or more of the fraction of resources (e.g., RBs) in the FFR portion and the fraction of resources in which a cell can expect higher signal-to-interference-plus-noise ratio (SINR) in the FFR portion of the spectrum, and sends the resource allocation parameters to each of cells 12a-12c. Upon receiving the fraction of resources allocated to the FFR portion, each of the cells 12a-12b can determine the number of resources allocated to each of the FFR portion and the reuse portion. Based upon the received resource allocation parameters, neighboring cells 12a-12c then exchange information with one another to determine the power allocation for specific resources in which a cell will set a higher or lower power allocation for each RB. In a particular embodiment, the determination of whether each RB should increase or decrease power is determined through an X2 message exchange between cells 12a-12c. In particular embodiments, the power allocation for each RB is measured as the power spectral density (PSD) for each RB. Accordingly, for a given set of power levels in the neighboring cell and the serving cell, the spectral density that can be supported for each UE on each set of RBs is determined.

In one or more embodiments, the parameter $\rho_{ffr}$ represents the fraction of RBs in the FFR portion of the spectrum and is determined by server 18 based upon given power levels and cell feedback. Referring again to the example of FIG. 3, for power levels $P_1$, $P_2$, and $P_3$ such that $P_3 \geq P_1 > P_2$, a parameter $P_{edge}$ represents the fraction of RBs with power $P_3$. The parameter $\rho_{low,interf}$ represents the fraction of RBs in which a cell transmits power $P_1$ but neighboring cell transmits at power $P_2$.

In one or more embodiments, each of cells 12a-12c receive performance metrics from each UE connected to it related to downlink power and feeds back the performance metrics to server 18. Based upon the received performance metrics, server 18 computes the fraction of RBs in the FFR portion of the spectrum, $\rho_{FFR}$, and provides resource allocation parameters including an indication of the computed fraction of RBs in the FFR portion to each of cells 12a-12c. Cells 12a-12c may then exchange messages amongst themselves to determine how specific resources should be allocated to each of cells 12a-12c, such as specific power allocation within the reuse one and FFR portions, based upon the indication of the computed fraction of RBs in the FFR portion.

Figure 4:
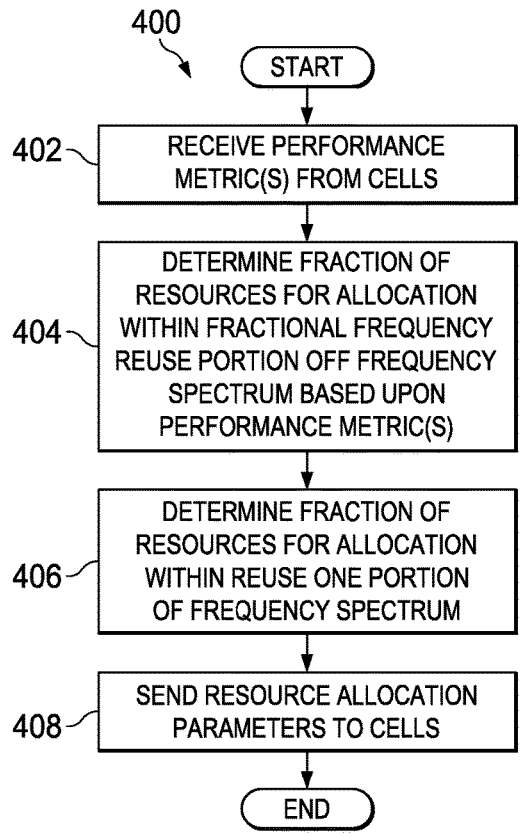
FIG. 4 is a simplified flow diagram illustrating example operations associated with a server in one example embodiment of the communication system.

Referring now to FIG. 4, FIG. 4 is a simplified flow diagram 400 illustrating example operations associated with server 18 in one example embodiment of communication system 10. In 402, server 18 receives one or more performance metrics from each of cells 12a-12c. In one or more embodiments, the performance metrics are associated with downlink transmission from each of cells 12a-12c to one or more user equipment devices associated with each cell 12a-12c. In one or more embodiments, each of cells 12a-12c receive one or more performance metrics from each UE connected to it related to downlink power and sends the performance metrics to server 18. In other embodiments, each of cells 12a-12c receives the one or more performance metrics from each UE connected to it, computes an effective rate representative of the overall throughput performance of all UEs associated with the particular cell for different values of $\rho_{FFR}$, and each of cells 12a-12c sends the computed effective rate to server 18.

In 404, server 18 determines the fraction of resources for allocation within the fractional frequency resource portion of the frequency spectrum, $\rho_{FFR}$, based upon the received one or more performance metrics as further described herein.

In one embodiment, the performance metrics received by each of cells 12a-12c are provided to server 18, and server 18 performs substantially all the computations required to determine the value of $\rho_{FFR}$ based upon the received performance metric. In a particular embodiment, the performance metrics that each of the cells 12-12c feeds back to server 18 includes the spectral efficiencies and/or average modulation and coding scheme (MCS) for each UE on (a) reuse one RBs, (b) FFR RBs with PSD $P_1$, (c) FFR RBs with PSD $P_2$, and (d) reuse 1 RBs with PSD $P_3$. Server 18 then computes the value of $\rho_{FFR}$ using the received spectral efficiencies and/or average MCS metrics. In a particular embodiment, server 18 computes the value of $P_{FFR}$ by solving a utility maximization resource allocation function across cells 12a-12c to allocate fractions of reuse one and FFR RBs to the UEs.

In another embodiment, the performance metrics are received by each of cells 12a-12c, and each of cells 12a-12c calculates an effective rate representative of the overall throughput performance of all UEs associated with the particular cell for different values of $\rho_{FFR}$. Each of cells 12a-12c then send the effective rate to server 18. In particular embodiments, the calculation of the effective rate by each of cells 12a-12c may include solving a utility function. Examples of effective rate computation that may be performed by each of cells 12a-12c in one or more embodiments include calculating a geometric mean of UE throughputs corresponding to a sum log utility, and calculating an inverse utility function of a sum of utilities of UE throughputs in the cell. In one or more embodiments, the utility function used to compute the effective rate may be configured by server 18 and/or may be specific to each of cells 12a-12c.

In particular embodiments, the effective rate is computed for each cell through solving a low complexity optimization function problem for a given value of $\rho_{FFR}$ and assuming other parameters are known. In solving the problem, an assumption is made that $\rho_{low,interf}$ scales linearly with $\rho_{FFR}$. In one or more embodiments, the scaling constant is determined by server 18 based upon the number of neighbors of each cell in the network. The optimization problem is performed over the numbers ($\alpha_j(i)$) of four types of RBs assigned to a UE i based on downlink power and reuse pattern. In one or more embodiments, the utility function U (r(i)) is a concave, monotone increasing function of r(i) so that $U^{-1}(.)$ is well defined. Example values of $\alpha_j(i)$ corresponding to the example of FIG. 3 are as follows:

Power $P_3$: $\alpha_3(i)$ RBs, SINR $\gamma_3(i)$
Power $P_2$: $\alpha_2(i)$ RBs, SINR $\gamma_2(i)$
Power $P_1$ in reuse one: $\alpha_{1,reuse}(i)$ RBs, SINR $\gamma_{1,reuse}(i)$
Power $P_1$ in FFR: $\alpha_{1,FFR}(i)$ RBs, SINR $\gamma_{1,FFR}(i)$ In order to solve the optimization problem the following function is optimized over $\alpha$:

Max. $\Sigma_i U(r(i))$
s.t.
$r(i) = \alpha_3(i) R_3(i) + \alpha_2(i) R_2(i) + \alpha_{1,reuse}(i) R_{1,reuse}(i) + \alpha_{1,FFR}(i) R_{1,FFR}(i)$
$\Sigma_i \alpha_3(i) = 1$, $\Sigma_i \alpha_2(i) = 1$, $\Sigma_i \alpha_{1,reuse}(i) = 1$, $\Sigma_i \alpha_{1,FFR}(i) = 1$
$\alpha_3(i) \geq 0$, $\alpha_2(i) \geq 0$, $\alpha_{1,reuse}(i) \geq 0$, $\alpha_{1,FFR}(i) \geq 0$ $R_j(i)$ are average spectral efficiencies provided by link adaptation for UE i The effective rate is $U^{-1}(\Sigma_i U (r^*(i)))$ The above optimization problem is to maximize a sum of concave function subject to linear constraints. In accordance with various embodiments, standard efficient computational methods can be used to exploit structure and compute an approximate solution.

$\alpha$ is the fraction of the resources that the UE allocated in that portion of the spectrum. Accordingly, the rate r(i) that a UE is allocated over time is a weighted average of the spectral efficiency across different portions. Upon solving the above problem, server 18 can determine the value of $\rho_{FFR}$.

In another embodiment, instead of solving an optimization problem to calculate $\rho_{FFR}$, an outer loop adaptation may be used to calculate $\rho_{FFR}$. In accordance with this embodiment, an initial value of $\rho_{FFR}$ is selected, and then $\rho_{FFR}$ is adapted in a closed loop manner based on feedback. In accordance with such an embodiment, a target threshold value for a performance metric, such as MCS or SINR, is selected for downlink transmissions to a UE. This target threshold value presents a tradeoff (in terms of spectral efficiency) between serving cell interior UEs at lower SINR and serving cell edge UEs at higher SINR. Each cell 12a-12c feeds back, to server 18, the number of UEs served by the particular cell that have a performance measure metric (e.g., SINR and/or MCS) in reuse one below the target threshold value on reuse one RBs, and the total number of UEs served by the particular cell. Server 18 then determines an initial value of $\rho_{FFR}$. The initial value of $\rho_{FFR}$ is chosen to be the fraction of total RBs where the fraction correspond to the ratio of UEs across the network with the performance metric (e.g., MCS and/or SINR) below the target threshold value to the total UEs in the network.

After the initial value of $\rho_{FFR}$ is chosen, $\rho_{FFR}$ is adapted according to further feedback from cells 12a-12c. For each UE served by a particular cell, the particular cell computes a median value for a block error rate (BLER) threshold (e.g., 10%) on $P_1$ RBs in reuse one spectrum via link adaptation prediction, and a fraction of high SINR RBs allocated to the UE. Each of cells 12a-12c feeds back the fraction of high SINR RBs allocated to UEs that have a value of the performance metric (SINR and/or MCS) in the reuse one part of the spectrum to be higher than the target threshold value. In the adaptation loop, $\rho_{FFR}$ is adapted such that a predefined percentile of downlink transmission to the UEs occur at a predefined performance metric threshold. In a particular embodiment, $\rho_{FFR}$ is increased if the predefined percentile (e.g. 90%) of the UEs among all cells 12a-12c have a performance metric that is below a predetermined threshold (e.g., SINR and/or MCS threshold). Conversely, $\rho_{FFR}$ is reduced if the predefined percentile (e.g. 90%) of the UEs among all cells 12a-12c have a performance metric that is above the predefined threshold.

In step 406, upon determining an updated value of $\rho_{FFR}$, server 18 determines the fraction of resources for allocation within the reuse one portion of the frequency spectrum based upon the determined fraction of resources for allocation within the fractional frequency reuse portion of the frequency spectrum ($\rho_{FFR}$). In a particular embodiment, upon determining the value of $\rho_{FFR}$, server 18 may determine the fraction of resources for allocation within the reuse one portion of the frequency spectrum by the equation $1 - \rho_{FFR}$.

In 408, server 18 sends resource allocation parameters including an indication of the fraction of resources for allocation within the fractional frequency reuse portion of the frequency spectrum ($\rho_{FFR}$) and an indication of the fraction of resources for allocation within the reuse one portion of the frequency spectrum to cells 12a-12c. Based upon this received information, cells 12a-12c communicate with one another in order to determine the specific resources allocated to each of cells 12a-12c. In particular embodiments, cells 12a-12c may communicate with one another via X2 messaging in order to determine the specific resource allocation among the FFR and reuse one portion used by each of cells 12a-12c. Accordingly, if many UEs which would obtain performance metrics (e.g. SINR and/or MCS) above the target threshold value in the reuse one portion but those UE keep getting allocations in the FFR portion, then the number of RBs in the FFR portion may be reduced to prevent wasting of resources in the network. If many UEs are scheduled in the reuse one portion, but the obtainable performance metrics (SINR and/or MCS) fall below the target threshold values, there are too few FFR resources and the number of resources in the FFR portion may be increased in response.

Flow 400 then ends. It should be understood that in various embodiment that flow 400 may be repeated on a continuous basis upon receiving updated performance metrics from cells 12a-12c so that the resource allocation between the FFR portion and the reuse one portion of the spectrum may be adapted according to changing conditions within network 10.

Figure 5:
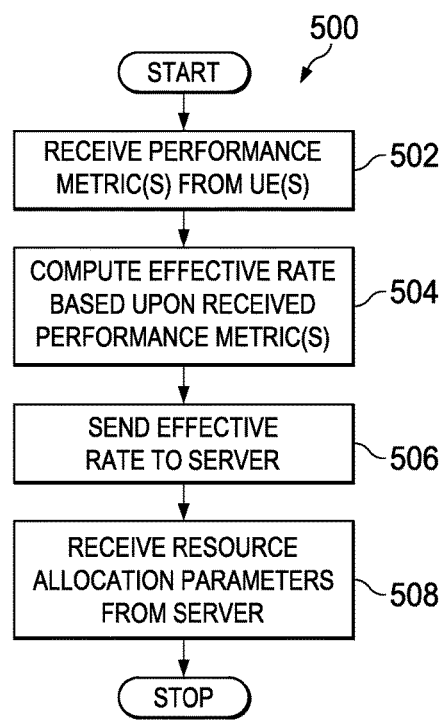
FIG. 5 is a simplified flow diagram illustrating example operations associated with a cell in one example embodiment of communication system.

Referring now to FIG. 5, FIG. 5 is a simplified flow diagram 500 illustrating example operations associated with cell 12a in one example embodiment of communication system 10. In the embodiment of FIG. 5, cell 12a is configured to compute an effective rate based upon performance metrics received from one or more UEs connected to cell 12a such as UE 16a and UE 16b, and feed back the effective rate to server 18 as previously discussed herein. In 502, cell 12a receives performance metrics from each of UE 16a and UE 16b related to downlink power performance between cell 12a and each of UE 16a and UE 16b.

In 504, cell 12a computes an effective rate for cell 12a based upon the received performance metrics received from each of UE 16a and UE 16b. As previously discussed, In particular embodiments the calculation of the effective rate by cell 12a may include solving a utility function based upon the received performance metrics.

In 506, cell 12a sends the computed effective rate for cell 12a to server 18. Based upon the computed effective rate received from cell 12a, server 18 may determine the fraction of resources for allocation within the fractional frequency resource portion of the frequency spectrum, $\rho_{FFR}$, based upon the received effective rate information as well as the fraction of resources for allocation within the reuse one portion of the frequency spectrum. Server 18 may then send resource allocation parameters including an indication of the fraction of resources for allocation within the fractional frequency reuse portion of the frequency spectrum ($\rho_{FFR}$) and an indication of the fraction of resources for allocation within the reuse one portion of the frequency spectrum to cell 12a.

In 508, cell 12a receives the resource allocation parameters from server 18. Cell 12a may then communicate with cells 12b-12c to determine the specific allocation of FFR resources and reuse one resources between cells 12a-12c based upon the received resource allocation parameters. Flow 500 then ends.

Other embodiments are directed to choosing power levels for fractional frequency reuse in the downlink between a cell and UE. In one or more embodiments, UE statistics are used to select power levels for each of the resources in the FFR portion of the spectrum.

Figure 6:
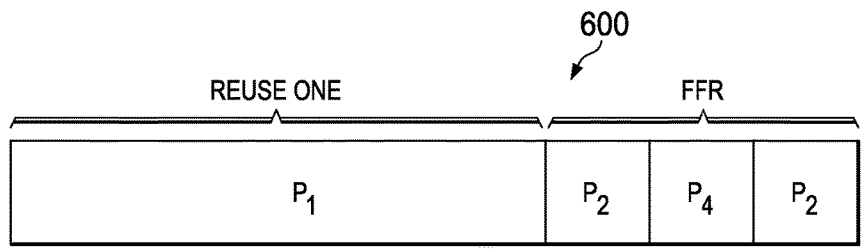
FIG. 6 is a simplified diagram of an example of resource block power allocation for the communication system of FIG. 1 in accordance with another embodiment.

FIG. 6 is a simplified diagram of an example of resource block power allocation 600 for communication system of FIG. 1 in accordance with another embodiment. In the embodiment of FIG. 6, three different power levels ($P_1$, $P_2$, and $P_4$) for resource blocks (RBs) are illustrated in which $P_4 > P_2$ where both $P_1$ and $P_2$ are power per RB (e.g., PSD). In the illustrated embodiment, $P_1$ is the power level used by all cells in the reuse one portion of the spectrum. In the FFR portion of the spectrum, three RBs are illustrated in which two RBs have a power level of $P_2$ and one RB has a power level of $P_4$. As previously described, the parameter $\rho_{FFR}$ represents the fraction of RBs in the FFR portion of the spectrum. The parameter $\rho_{low\_interf}$ represents the fraction of RBs in which a cell transmits power at power level $P_4$ but a neighboring cell transmits at power level $P_2$. In accordance with various embodiments, server 18 is configured to determine values of $\rho_{low,interf}$ and power per RB for $P_1$, $P_2$, and $P_4$ for a given value of $\rho_{FFR}$ based upon feedback received from cells as will be further described herein.

Figure 7:
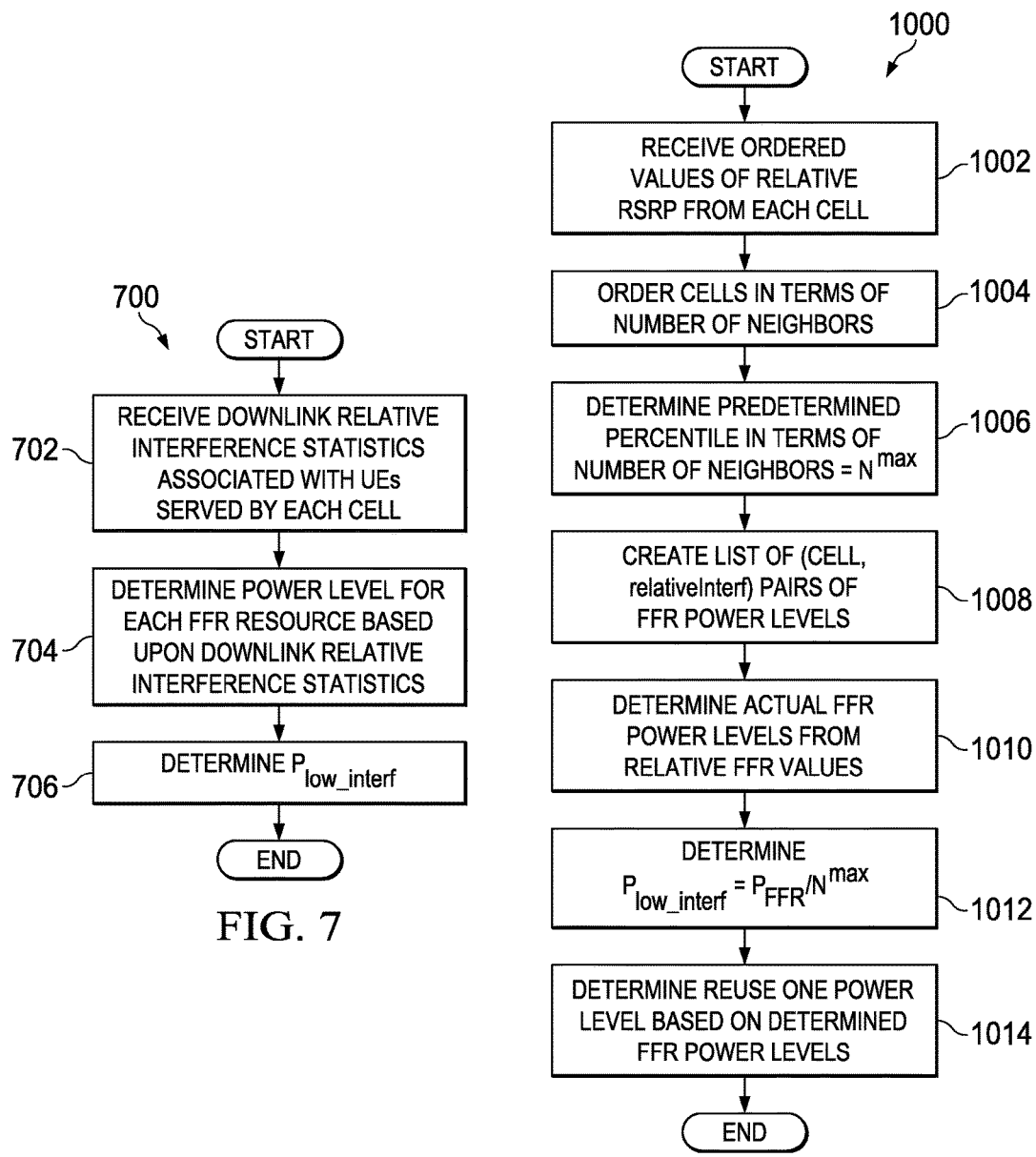
FIG. 7 is a simplified flow diagram illustrating example operations associated with downlink inter-cell interference management in one example embodiment of the communication system.

Referring now to FIG. 7, FIG. 7 is a simplified flow diagram 700 illustrating example operations associated with downlink inter-cell interference management in one example embodiment of communication system 10. In 702, server 18 receives downlink relative interference statistics associated with the UEs served be each of cells 12a-cells 12c. In one example, server 18 receives downlink relative interference statistics associated with UEs 16a-16b from cell 12a, receives downlink relative interference statistics associated with UEs 16c-16d from cell 12b, and receives downlink relative interference statistics associated with UEs 16e-16f from cell 12c.

In accordance with particular embodiments, each of cells 12a-12c determines relative Reference Signal Received Power (RSRP) values for each UE served by the particular cell and determines either UE specific downlink relative interference statistics or cell specific downlink relative interference statistics from the RSRP values. In an embodiment in which each of cells 12a-12c sends back UE specific feedback, each of cells 12a-12c sends back downlink relative interference values as the downlink relative interference statistics for each UE served by the particular cell to server 18 as will be further described herein. In an embodiment in which each of cells 12a-12c sends back cell specific feedback, each cell 12a-12c determines downlink relative interference statistics for the particular cell from the relative interference values received from each UE and sends the downlink relative interference statistics to server 18 as will be further described herein.

In 704, server 18 determines a power level for each resource (e.g., resource block (RB)) within the FFR portion of the spectrum based upon the received downlink relative interference statistics received from each of cells 12a-12c as further described herein. In a particular embodiment, server 18 determines the power level per RB for $P_4$, $P_2$, and $P_1$ based upon the received downlink relative interference statistics. In 706, server 18 determines the value of $\rho_{low\_interf}$ representative of a fraction of RBs where a particular cell transmits at a first FFR power level (e.g., $P_4$) but a neighboring cell transmits at a second FFR power level (e.g. $P_2$). In a particular embodiment, $\rho_{low\_interf}$ is set to $\rho_{FFR}/N^{max}$ in which $N^{max}$ denotes the maximum sum of neighbors of a cell in the network and $\rho_{FFR}$ is equal to the fraction of RBs within the FFR portion of the spectrum. Flow 700 then ends.

Figure 8:
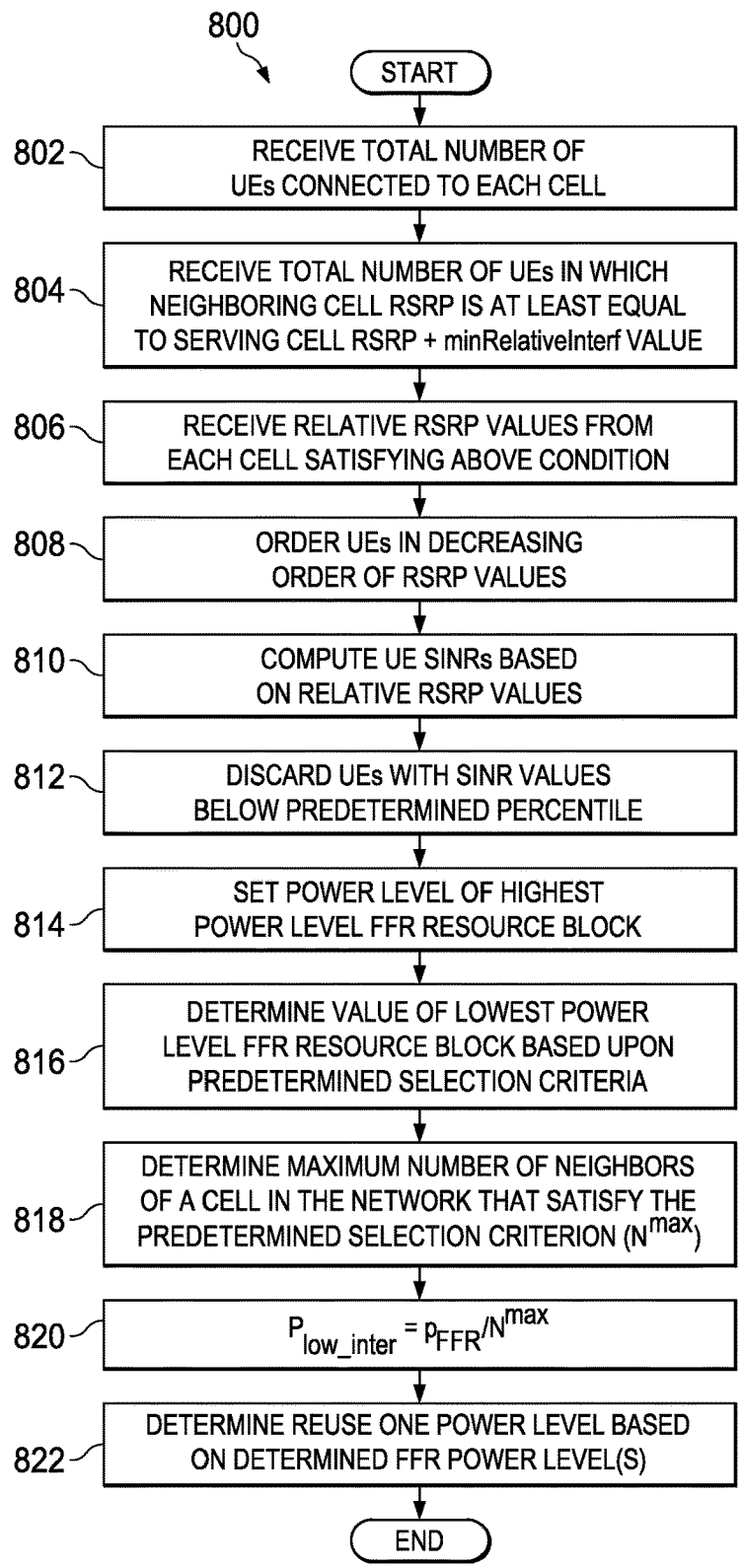
FIG. 8 illustrates a simplified flow diagram illustrating example operations associated with downlink inter-cell interference management using UE specific feedback in accordance with one embodiment.

Referring now to FIG. 8, FIG. 8 illustrates a simplified flow diagram 800 illustrating example operations associated with downlink inter-cell interference management using UE specific feedback in accordance with one embodiment. In 802, server 18 receives, from each of cells 12a-12c, an indication of the total number of UEs connected to the particular cell. In 804, server 18 receives, from each of cells 12a-12c, an indication of the total number of UEs for which the neighboring cell RSRP is at least equal to the serving cell RSRP plus a minimum relative interference value, minRelativeInterf. In 806, server 18 receives, from each of cells 12a-12c, a relative RSRP value from each of the UEs satisfying the above condition in which the neighboring cell RSRP is at least equal to the serving cell RSRP+minRelativeInterf.

In 808, server 18 orders the UEs in all cells in decreasing order of their RSRP when the serving cell and the interfering cells all transmit at the same power. In 810, server 18 computes SINRs for each of the UEs based on the received relative RSRP values. In 812, server 18 discards the UEs having an SINR value below a predetermined percentile (e.g., the 5th percentile). In 814, server 18 sets the power level of the highest power level FFR resource block (e.g., $P_4$) to a predetermined value assuming uniform distribution of maximum cell power across the frequency spectrum.

In 816, server 18 determines a value of the lowest power level FFR resource block (e.g., $P_2$) based upon a predetermined selection criterion utilizing the non-discarded UEs within the predetermined percentile (e.g., the 5th percentile). A first criterion according to a particular embodiment considers the value of $P_2$ at the strongest neighboring cell such that when it transmits at power $P_2$ per RB and the serving cell transmits at power $P_4$ RB, the RSRP from the neighboring cell is less than or equal to the serving cell RSRP minus a predetermined threshold value $\Delta$ (e.g., 6 dB). A second criterion according to a particular embodiment considers the neighboring cells for which RSRP is greater than or equal to the RSRP of the serving cell plus a predetermined threshold value $\Delta$ (e.g., 6 dB). A power per RB $P_2$ is computed such that when all neighboring cells according to the first criterion transmit at power $P_2$ per RB but the serving cell transmits at power $P_4$ per RB, the expected SINR at the UE is above a minimum SINR threshold.

In 818, server 18 determines the maximum number of neighbors of a cell in the network ($N^{max}$) that satisfy the predetermined selection criterion focusing on the UEs which were not discarded. In a particular embodiment, the number of neighbors of a cell $N^{max}$ is equal to those that satisfy the first criterion or the second criterion for at least one UE in the cell. In 820, server 18 determines $\rho_{low\_interf} = \rho_{FFR}/N^{max}$. In 822, server 18 determines the reuse one power level value (e.g., $P_1$) based upon one or more of the determined FFR power level values (e.g., $P_4$ or $P_2$). In one embodiment, the reuse one power level value ($P_1$) is set to the highest power level FFR resource block (e.g., $P_4$) and the relative value of $P_2$ previously determined is used. $P_1$ and $P_2$ are selected such that the total power for the cells add up to the maximum transmit power for the cell. In another embodiment, the reuse one power level value ($P_1$) is set to the lowest power level FFR resource block (e.g., $P_2$). The flow 800 then ends.

Figure 9:
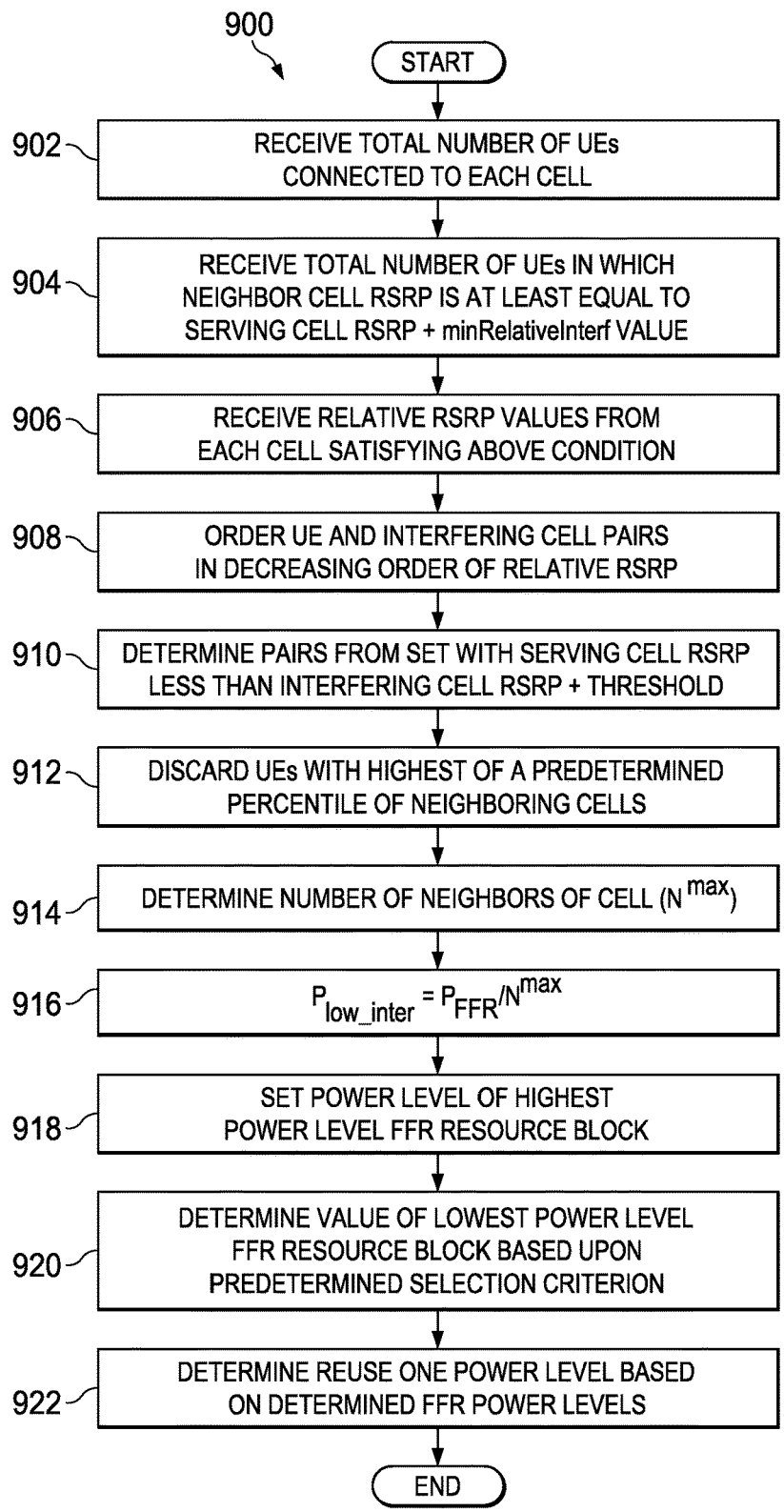
FIG. 9 illustrates a simplified flow diagram illustrating example operations associated with downlink inter-cell interference management using UE specific feedback in accordance with another embodiment.

Referring now to FIG. 9, FIG. 9 illustrates a simplified flow diagram 900 illustrating example operations associated with downlink inter-cell interference management using UE specific feedback in accordance with another embodiment. In 902, server 18 receives, from each of cells 12a-12c, an indication of the total number of UEs connected to the particular cell. In 904, server 18 receives, from each of cells 12a-12c, an indication of the total number of UEs for which the neighboring cell RSRP is at least equal to the serving cell RSRP plus a minimum relative interference value, minRelativeInterf. In 906, server 18 receives, from each of cells 12a-12c, a relative RSRP value from each of the UEs satisfying the above condition in which the neighboring cell RSRP is at least equal to the serving cell RSRP+minRelativeInterf.

In 908, server 18 orders UE and interfering cell pairs in decreasing order of relative RSRP from interfering cell with respect to the serving cell. In 910, server 18 determines the pairs from the set with a serving cell RSRP less than a interfering cell RSRP+a predetermined threshold value Δ. In 912, server 18 discards UEs with a highest predetermined percentile (e.g., 5th percentile) of RSRP for neighboring cells. In 914, server 18 determines the number of neighbors of a cell, N', equal to the maximum over the UEs associated with the cell satisfying the criterion that the serving cell RSRP is less than the interfering cell RSRP plus a predetermined threshold value Δ. In 916, server 18 determines $\rho_{low\_interf} = \rho_{FFR}/N^{max}$.

In 918, server 18 sets the power level of the highest power level FFR resource block (e.g., $P_4$) to a predetermined value assuming uniform distribution of maximum cell power across the frequency spectrum. In 920, server 18 determines a value of the lowest power level FFR resource block (e.g., $P_2$) based upon a predetermined selection criterion utilizing the non-discarded UEs within the predetermined percentile. A first criterion according to a particular embodiment considers the value of $P_2$ at the strongest neighboring cell such that when it transmits at power $P_2$ per RB and the serving cell transmits at power $P_4$ RB, the RSRP from the neighboring cell is less than or equal to the serving cell RSRP minus a predetermined threshold value Δ (e.g., 6 dB). A second criterion according to a particular embodiment considers the neighboring cells for which RSRP is greater than or equal to the RSRP of the serving cell plus a predetermined threshold value Δ (e.g., 6 dB). A power per RB $P_2$ is computed such that when all neighboring cells according to the first criterion transmit at power $P_2$ per RB but the serving cell transmits at power $P_4$ per RB, the expected SINR at the UE is above a minimum SINR threshold.

In 922, server 18 determines the reuse one power level value (e.g., $P_1$) based upon one or more of the determined FFR power level values (e.g., $P_4$ or $P_2$). In one embodiment, the reuse one power level value ($P_1$) is set to the highest power level FFR resource block (e.g., $P_4$) and the relative value of $P_2$ previously determined is used. $P_1$ and $P_2$ are selected such that the total power for the cells add up to the maximum transmit power for the cell. In another embodiment, the reuse one power level value ($P_1$) is set to the lowest power level FFR resource block (e.g., $P_2$). The flow 900 then ends.

Referring now to FIG. 10, FIG. 10 illustrates a simplified flow diagram 1000 illustrating example operations associated with downlink inter-cell interference management using cell specific feedback in accordance with another embodiment. In 1002, server 18 receives ordered values of relative RSRP from each of cells 12a-12c as follows: The first value corresponds to the maximum among UEs associated with the cell having a maximum value of relative interference (relativeInterf) such that the strongest interfering cell RSRP is equal to at least the serving cell RSRP+relativeInterf. The corresponding neighboring cell is denoted as $C_1$. The second value corresponds the maximum among UEs associated with the cell having a maximum value of relative interference (relativeInterf) such that the strong interfering cell, other than $C_1$, RSRP is equal to at least the serving cell RSRP+relativeInterf. Additional values for all neighboring cells such that the neighboring cell RSRP is at least serving cell RSRP+a minimum relative interference (minRelativeInterf) at a minimum of one UE associated with the serving cell.

In 1004, server 18 orders the cells in terms of the number of neighbors. In 1006, server 18 determines a predetermined percentile (e.g., 80th percentile) of the ordered cells in terms of number of neighbors. This corresponds to the number of neighbors of a cell $N^{max}$. In 1008, server 18 creates a list of (cell, relativeInterf) pairs of FFR power levels ($P_4$, $P_2$) chosen such that when a given cell transmits at $P_4$ per RB and neighboring cells transmit at $P_2$ per RB, then for a predetermined percentage of pairs (e.g., 80%), the resulting interference is lowered to a predetermined threshold below serving cell power. This determines the relative values for the FFR power levels ($P_2$, $P_4$).

In 1010, server 18 determines actual values of the FFR power levels ($P_2$, $P_4$) from the relative values. In 1012, server 18 determines $\rho_{low\_interf} = \rho_{FFR}/N^{max}$. In 1014, server 18 determines the reuse one power level value (e.g., $P_1$) based upon one or more of the determined FFR power level values (e.g., $P_4$ or $P_2$). In one embodiment, the reuse one power level value ($P_1$) is set to the highest power level FFR resource block (e.g., $P_4$) and the relative value of $P_2$ previously determined is used. $P_1$ and $P_2$ are selected such that the total power for the cells add up to the maximum transmit power for the cell. In another embodiment, the reuse one power level value ($P_1$) is set to the lowest power level FFR resource block (e.g., $P_2$). The flow 1000 then ends.

Figure 11:
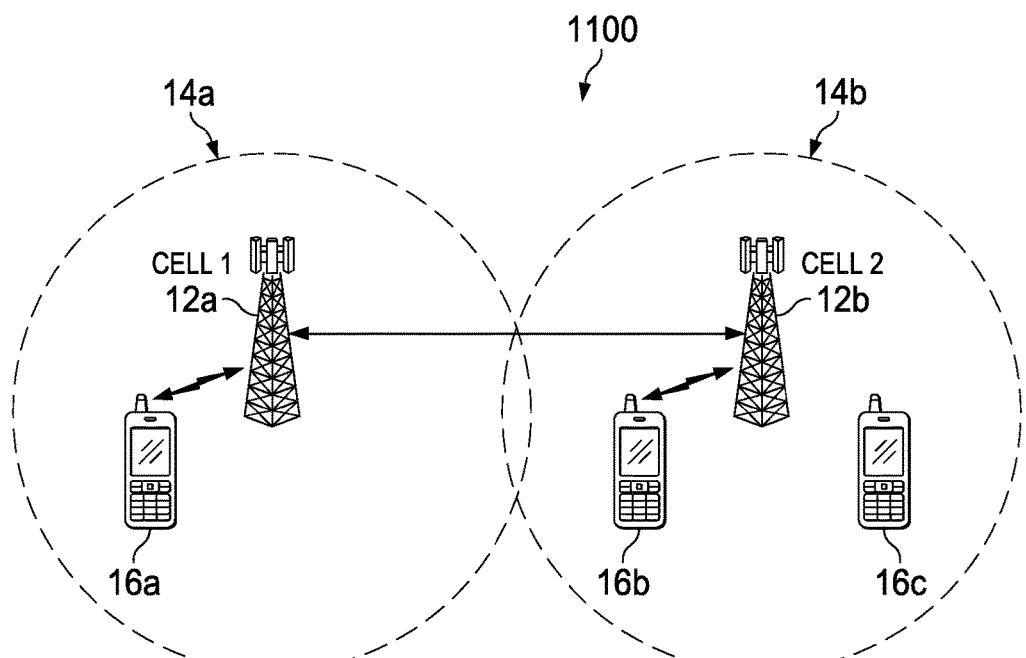
FIG. 11 is a simplified block diagram of a communication system for selecting cells for downlink inter-cell interference coordination (ICIC) in accordance with one embodiment of the present disclosure.

Referring now to FIG. 11, FIG. 11 is a simplified block diagram of a communication system 1100 for selecting cells for downlink inter-cell interference coordination (ICIC) in accordance with one embodiment of the present disclosure. Communication system 1100 of FIG. 11 includes a first cell (Cell 1) 12a having a first coverage area 14a, and a second cell (Cell 2) 12b having a second coverage area 14b. In accordance with one or more embodiments, first cell 12a and second cell 12b are each a long term evolution (LTE) evolved Node B (eNodeB). In other embodiments, first cell 12a and second cell 12b may be any suitable base station such as a femtocell. First coverage area 14a and second coverage area 14b are representative of a geographic area for which first cell 12a and second cell 12b, respectively, can effectively provide service to a user equipment device therein.

First cell 12a includes a first user equipment (UE) device 16a located within the interior of first coverage area 14a and served by first cell 12a. Second cell 12b includes second user equipment (UE) device 16b located near the edge of the second coverage area and third user equipment (UE) device 16c located within second coverage area 14b and served by second cell 12b. In the embodiment illustrated in FIG. 11, first cell 12a and second cell 12b are in communication with one another. In one or more embodiments, first cell 12a and second cell 12b allocate resources within their respective coverage areas 14a-14b using a frequency domain inter-cell interference coordination (ICIC) framework in which interference is managed through Fractional Frequency Reuse (FFR). In particular embodiments, it is assumed that that all cells that participate in the ICIC scheme have the same fraction of resources in reuse one portion of the spectrum and the FFR portion of the spectrum.

Various embodiments are directed selecting a subset of cells in the network that should participate in inter-cell interference coordination (ICIC) while all other cells may transmit at the same power (e.g., PSD) on all resource blocks (RBs) in the frequency spectrum. When a FFR scheme is implemented, if a particular cell does have not any interfering cells there is no reason for the particular cell to reduce power on any of the resource blocks (RBs). It is desirable to perform interference management only on the subset of cells experiencing interference from other cells in order to maximize network capacity. Accordingly, a cell which does not cause significant interference to UEs in neighboring cells does not have to lower power on any RBs. In addition, cells which participate in ICIC and have UEs which suffer from interference can obtain more resources at higher SINR without loss of performance in cells which do no cause interference.

Figure 12:
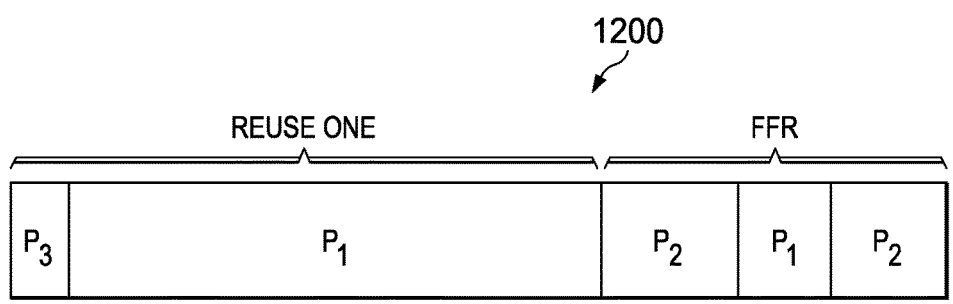
FIG. 12 is a simplified diagram of an example of resource block power allocation for the communication system of FIG. 11 in accordance with one embodiment.

FIG. 12 is a simplified diagram of an example of resource block power allocation for the communication system 1100 of FIG. 11 in accordance with one embodiment. In the embodiment of FIG. 12, three different power levels ($P_1$, $P_2$, and $P_3$) for resource blocks (RBs) are illustrated in which $P_3>P_1>P_2$ where $P_1$, $P_2$, and $P_3$ are power per RB (e.g., PSD). In the illustrated embodiment, the reuse one fraction of resources is lowered in order to server interference limited users. In the reuse one portion of the spectrum, two RBs are illustrated in which $P_1$ and $P_3$ are power levels used by cells. In the FFR portion of the spectrum, three RBs are illustrated in which two RBs have a power level of $P_2$ and one RB has a power level of $P_1$. The parameter $\rho_{FFR}$ represents the fraction of RBs in the FFR portion of the spectrum. The parameter $\rho_{edge}$ represents the fraction of RBs with power $P_3$. The parameter $\rho_{low\_interf}$ represents the fraction of RBs in which a cell transmits power at power level $P_1$ but a neighboring cell transmits at power level $P_2$. In one or more embodiments, it is assumed that $P_1 \geq P_{max}/N_{RB}$ where $P_{max}$ represents total power of the cell, and $N_{RB}$ represents the total of RBs used by the cell.

Referring again to FIG. 11, first UE 16a can obtain a high SINR on RBs on which first cell 12a transmits at power $P_1$ and second cell 12b transmits at power $P_1$. Hence, second cell 12b does not need to reduce its power per RB to $P_2$ on any RB to allow first cell 12a to serve first UE 16a. In general, if first cell 12a does not serve a UE on the edge of the coverage areas of first cell 12a and second cell 12b, second cell 12b does not need to reduce power on any RB for first cell 12a to serve cell edge UEs. It should be noted that the converse may not be true. For example, in the illustrated example second UE 12b is on the edge of coverage areas of first cell 12a and second cell 12b, and is served by second cell 12b.

In accordance with one or more embodiments, a particular cell should participate in interference coordination if either of the following is true: 1) at least one of the UEs of the cells suffers from high interference from a neighboring cell; or 2) a given cell causes high interference to a UE of a neighboring cell. In various embodiments, a process of distributed interference management is provided in which a cell which is non-interfering does not reduce its power on any RBs and a cell which is non-interfered does not request its neighboring cells to reduce power levels on any RBs.

In determining whether a particular cell is a non-interfering cell, it is assumed that a given cell transmits with power per RB of $P_1$. A cell is considered to be non-interfering if there is no neighboring cell such that when the neighboring cell also transmits with power per RB of $P_1$, any UE connected to that cell receives the signal from the given cell at a power less than equal to the signal from its own serving cell minus a fixed threshold value. In one or more embodiments, the criterion may be evaluated on the basis or RSRP measurements. In particular embodiments, a cell is non-interfering if the following is true of all neighboring cells: RSRP from a given cell is less than the RSRP for a neighboring cell minus the fixed threshold value as measure at any UE associated with the neighboring cell. In particular embodiments, to determine whether the cell is non-interfering requires inputs from multiple neighboring cells in LTE.

In determining whether a particular cell is a non-interfered cell, it is assumed that a given cell transmits with power per RB of $P_1$. A cell is considered to be non-interfered if there is no neighboring cell such that when the neighboring cell also transmits with power per RB of $P_1$, any UE connected with the given cell receives the signal from the given cell at a power greater than equal to the signal from the neighboring cell plus a fixed threshold value. In one or more embodiments, the criterion may be evaluated on the basis or RSRP measurements. In a particular embodiment, a cell is non-interfered if the following is true of all neighboring cells: RSRP from the given cell is greater than the RSRP for the neighboring cell plus the fixed threshold value as measured at any UE associated with the given cell. In particular embodiments, whether a cell is non-interfered can be evaluated locally at the eNB in LTE networks.

In a distributed interference management scheme according to one or more embodiments, in a first component when a particular cell A is non-interfering to a given cell B, then the given cell B indicates to cell A that it has no cell edge UEs. In a second component, when no neighboring cell indicates to cell B that it has cell edge UEs, then cell B does not reduce power to $P_2$ on any RB. In such a case, cell B can distribute power across the RBs in any manner, as long as the power constraint corresponding to power per RB $P_1$, $P_3$ are obeyed on appropriate RBs. In a third component of a cell is non-interfered, it does not indicate to any neighboring cell that it has cell edge UEs.

In some embodiments, ICIC is performed among cells using X2 messages such as using relative narrow-band transmit power (RNTP) messages between the cells. RNTP messages include a bit-mapping of resource blocks (RB) in which a bit corresponding to a particular RB is either given a value of one or zero. An ICIC scheme is assumed through which resources with power levels $P_1$ and $P_2$ are determined in a distributed manner through the exchange of RNTP messages. In a particular embodiment, if a bit for a given RB is set within a RNTP message it represents an indication that the cell will use transmission per RB of $P_1$. However, if the bit is not set within the RNTP message is represents an indication that the cell will use transmission per RB of $P_2$.

If a cell is non-interfering to a given cell, the RNTP message from the given cell to that cell contains all zeros for the FFR RBs. A cell which receives no RNTP message or only RNTP messages from neighboring cells with all zeros for FFR RBs does not need to lower its power on any RBs. If a cell is a non-interfered cell, then it only sends RNTP message with all zeros to its neighboring cells. This cell may be required to reduce power on certain RBs on the basis of RNTP messages received from other cells.

Figure 13:
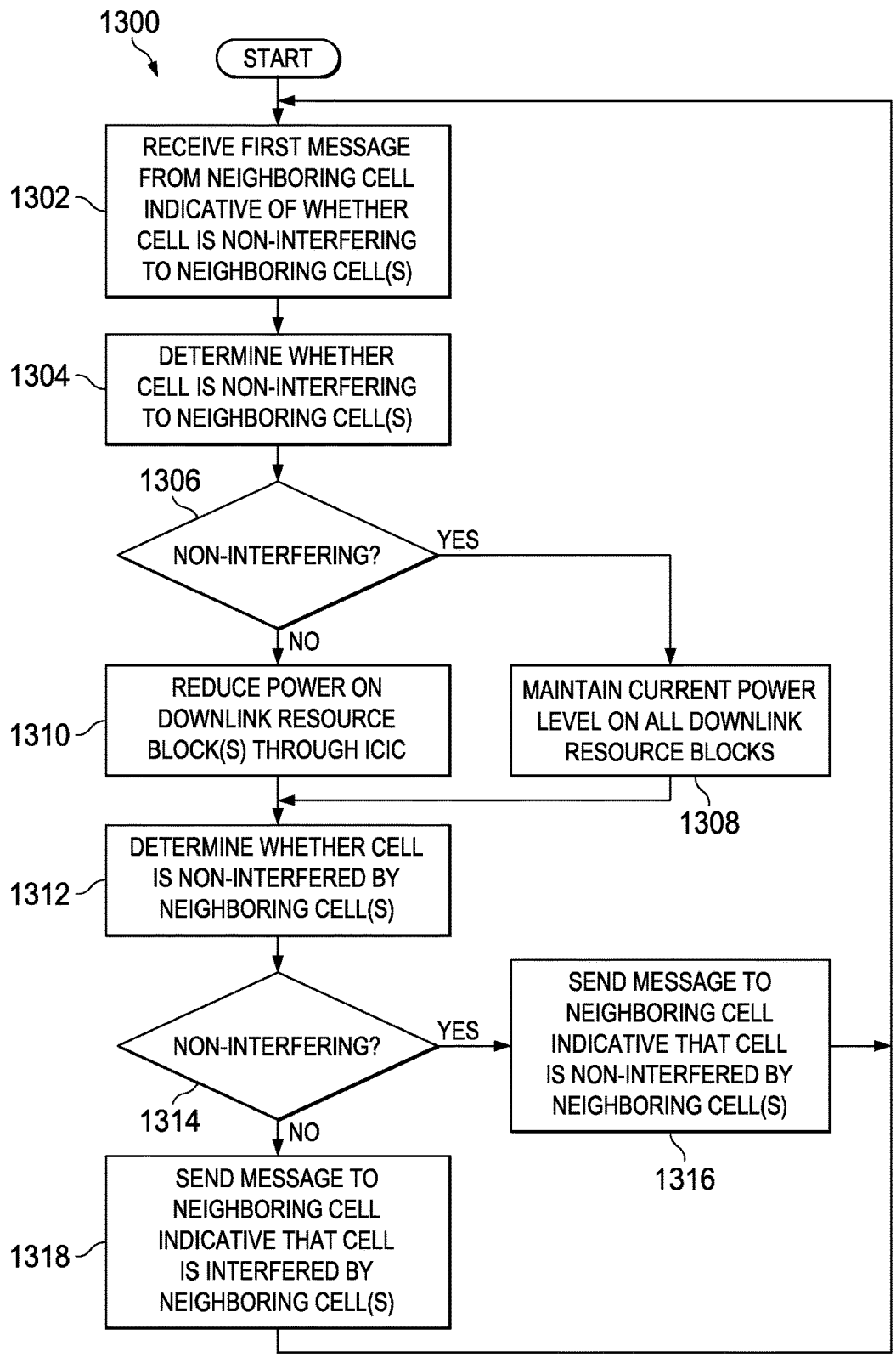
FIG. 13 illustrates a simplified flow diagram illustrating example operations associated with selecting cells for downlink inter-cell interference coordination (ICIC) in accordance with one embodiment of the present disclosure.

Referring now to FIG. 13, FIG. 13 illustrates a simplified flow diagram 1300 illustrating example operations associated with selecting cells for downlink inter-cell interference coordination (ICIC) in accordance with one embodiment of the present disclosure. In 1302, a particular cell, such as first cell 12a, receives a first message from one or more neighboring cells, such as second cell 12b indicative of whether the cell is non-interfering to the neighboring cell(s). In one or more embodiments, a cell is considered to be non-interfering if there is no neighboring cell such that when the neighboring cell also transmits with power per RB $P_1$, any of one or more UEs (e.g., UE 16b and/or UE 16c) connected to second cell 12b receives the signal from the cell at a power less than equal to the signal from its own serving cell (e.g., second cell 12b) minus a fixed threshold. In one or more embodiments, the criterion that the neighboring cell uses to determine whether a given cell is an interfering cell includes an evaluation on the basis of RSRP measurements such that RSRP from a given cell is less than the RSRP for the neighboring cell minus the fixed predetermined threshold as measured at any UE associated with the neighboring cell. In one or more embodiments, when the cell is non-interfering to a neighboring cell, the neighboring cell indicates to the cell that it has no cell edge UEs connected to it.

In a particular embodiment, if a cell is non-interfering to a neighbor cell, the RNTP message from the neighbor cell contains all zero bits values for the FFR RBs. A cell which receives no RNTP message or only RNTP messages from neighboring cells with all zero bit values for FFR RBs, does not need to lower its power on any RBs.

In 1304, the cell determines whether the cell is a non-interfering cell to neighboring cells based upon the received first message. In 1306, if the first message is indicative of the cell being a non-interfering cell the flow continues to 1308. In 1308, the cell maintains the current power level on all downlink resource blocks and flow continues to 1312. Accordingly, the cell is selected to not participate in ICIC. For example, in a particular embodiment when no neighboring cell indicates that it has cell edge UEs, the cell does not reduce power to $P_2$ on any RB and can distribute power across the RBs in any manner, as long as the power constraint corresponding to power RB $P_b$, $P_3$ are obeyed on appropriate RBs. In 1306, if the first message is indicated of the cell being an interfering cell the flow continues to 1310. In 1310, the cell reduces power on one or more downlink resource blocks through participation in ICIC and the flow continues to 1312.

In 1312, the cell determines if the cell is non-interfered by one or more neighboring cells. In one or more embodiments, the cell determines that the cell is non-interfered by one or more neighboring cells if when the neighboring cell also transmits with power per RB $P_1$, any UE connected with the cell receives the signal from the cell at a power greater than equal to the signal from the neighboring cell plus a fixed threshold. In particular embodiments, the criterion can be evaluated on the basis of RSRP measurements such that a cell is non-interfered if for all neighboring cells RSRP from the cell is greater than the RSRP for the neighboring cell plus a fixed threshold as measured at any UE associated with the cell. In 1314, if the cell determines that it is non-interfered by neighboring cells the flow continues to 1316. In 1316, the cell sends a message to the neighboring cell(s) indicative that the cell is non-interfered by neighboring cell(s). In a particular embodiment, if a cell is a non-interfered cell, the cell sends RNTP messages with all zero bit values to its neighboring cells. In response to receiving the message indicative that the cell is non-interfered, one or more of the neighboring cells may maintain its current power levels on all downlink RBs and not participate in an ICIC scheme. The flow then returns to 1302.

In 1314, if the cell determines that it is interfered by neighboring cells the flow continues to 1318. In 1318, the cell sends a message to the neighboring cell(s) indicative that the cell is interfered by the neighboring cell(s). In response to receiving the message indicative that the cell is interfered by the neighboring cell, the neighboring cell may reduce the power levels on one or more downlink RBs, such as FFR RBs, and thus be selected for participation in the ICIC scheme. The flow then returns to 1302.

Accordingly, in a particular embodiment for a cell that is not causing interference to any of the neighboring cells even when transmitting at $P_1$, all RBs can have power level $P_1$. If a cell is not receiving interference from any of the neighboring cells, then all power levels in the RBs can be $P_2$ because it doesn't need to boost it's power to UEs at a cell edge.

Other embodiments are directed to user equipment (UE) power level selection for downlink. It should be understood that in an LTE system the power level at which a particular UE is served on the downlink by a cell cannot vary arbitrarily from one subframe to another because the UE needs to know the ratio of the reference signal power which is constant across all of the bandwidth to the data signal power in order to perform decoding optimally. Considering downlink transmission modes in which a UE demodulates using Cell Specific Reference Signals (CRS) received from the cell, the UE is signaled the ratio of CRS energy per resource element (EPRE) to the data (e.g., Physical Downlink Shared Channel (PDSCH) EPRE via radio resource control (RRC) protocol signaling. In order to change the PDSCH EPRE, the UE needs to be informed via RRC signaling a few subframes in advance of the change. The CRS EPRE is typically kept constant over long periods of time. Hence, a serving cell needs to compute the PDSCH EPRE per UE in a semi-static matter in which cell edge UEs have the highest PDSCH EPRE and the cell interior UEs have lower PDSCH EPRE.

Figure 14:
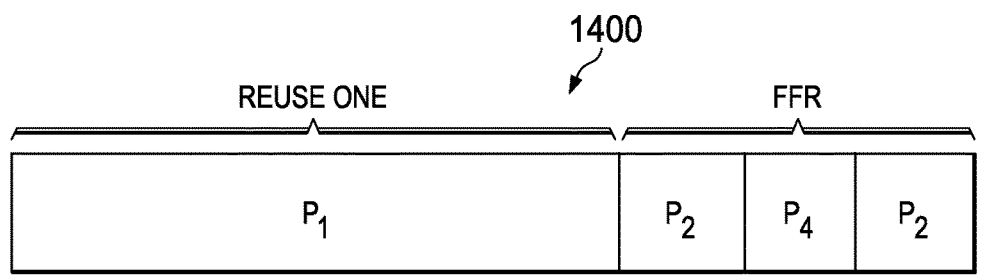
FIG. 14 is a simplified diagram of an example of resource block power allocation for the communication system of FIG. 1 in accordance with one embodiment.

FIG. 14 is a simplified diagram of an example of resource block power allocation 1400 for the communication system 10 of FIG. 1 in accordance with one embodiment. In the embodiment of FIG. 14, three different power levels ($P_1$, $P_2$, and $P_4$) for resource blocks (RBs) are illustrated in which $P_4 > P_2 > P_1$ where $P_1$, $P_2$, and $P_4$ are power per RB (e.g., PSD). In the reuse one portion of the spectrum, one RB is illustrated in which $P_1$ is the power levels used by cells. In the FFR portion of the spectrum, three RBs are illustrated in which two RBs have a power level of $P_1$ and one RB has a power level of $P_4$.

The power level of downlink data transmission will typically vary across the frequency spectrum. For example, if it is desired to schedule a particular UE in a portion of the spectrum having a power level $P_1$ and a few subframes later schedule the UE in a portion of the spectrum having power level $P_4$, a control message is sent at power level $P_1$ indicating that the cell is going to change the data power level with respect to the reference to some different value.

Accordingly, it is necessary for the cell to periodically determine which set of UEs will be scheduled at each of the power levels of the spectrum. In accordance with particular embodiments, for the subset of RBs in the reuse one portion of the spectrum all cells use the same transmission power per RB, $P_1$, for reuse one RBs. For the subset of RBs in the FFR portion of the spectrum, on RBs with power per RB $P_4$, neighboring cells lower their power per RB to $P_2 < P_4$ such that a given cell's UEs attain higher SINR.

In various embodiments, given a choice of power levels for the UEs and the knowledge of interference levels in different portions of the spectrum, the cell determines the power level that each UE should be scheduled at. In particular embodiments, a cell computes PDSCH EPRE for each UE based on the 1) number of resource blocks (RBs) that the cell can use to transmit at a given EPRE (e.g., due to interference considerations, power constraints, etc.), and 2) estimated spectral efficiency (e.g, based on MCS for 90 BLER on first transmission) at a given PDSCH EPRE and on each RB in the frequency domain on the downlink. The interference and channel to the UE may vary across different RBs. In particular embodiments, estimation of MCS is through an LTE Link Adaption Algorithm.

In one embodiment, a case is considered in which two PDSCH EPREs, $P_1 > P_2$, are allowed in which the set of UEs to be used for each EPRE are computed. In other embodiments, the case is generalized in which multiple (N) EPREs, $P_1 > \ldots > P_N$ are allowed in which the set of UEs to be used for each of the N EPREs are computed. In both cases, classification of UEs is based upon a threshold policy based upon the average wideband channel quality between the cell (e.g., eNB) and the UE in which a threshold is computed based on throughput performance of all UEs in the cell. Based upon whether a particular UE exceeds the threshold value, the particular UE may be classified by identifying a particular UE as either a cell interior UE which can tolerate a higher amount of interference or a cell edge UE which may have a low tolerance to interference. Based upon the classification, the power levels for the RBs in the frequency spectrum are calculated and assigned to the respective RBs.

In one or more embodiments, downlink transmission power level for multiple UEs in a cell are determined based on the overall throughput performance of all UEs in the cell. In one or more particular embodiments, a power level is chosen for a particular UE from a plurality of power levels on different RBs in the cell such that the average spectral efficiency of UEs with higher power level and lower interference is higher than the average spectral efficiency if the particular UE shared resources with other UEs that are served by RBs with lower power level and higher interference. In accordance with one or more embodiments, power levels of UEs are adapted as one or more of the UEs' channel conditions change. In particular embodiments, a hysteresis tolerance may be used for adaptation such that one or more UEs' power levels are changed if in addition to the criterion described above, the average throughput in the cell will improve by a predetermined amount, such as a percentage (e.g., five percent (5%)), if such a power level change is performed.

Figure 15:
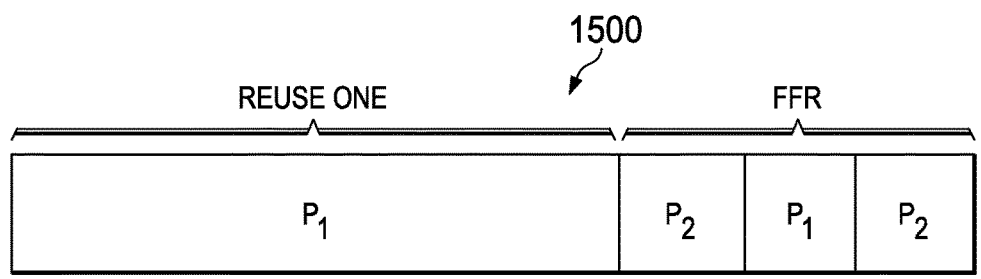
FIG. 15 is a simplified diagram of an example of resource block power allocation for cell interior UEs for the communication system of FIG. 1 in accordance with one embodiment.

FIG. 15 is a simplified diagram of an example of resource block power allocation 1500 for cell interior UEs for the communication system 10 of FIG. 1 in accordance with one embodiment. In the embodiment of FIG. 15, two different power levels ($P_1$, and $P_2$) for resource blocks (RBs) are illustrated in which $P_2 > P_1$ where $P_1$ and $P_2$ are power per RB (e.g., PSD). In the reuse one portion of the spectrum, one RB is illustrated in which $P_1$ is the power level used by cells. In the FFR portion of the spectrum, three RBs are illustrated in which two RBs have a power level of $P_2$ and one RB has a power level of $P_1$. In accordance with one or more embodiments, power level $P_1$ is kept fixed in the reuse one portion of the spectrum and a determination is made regarding wither a particular UE located in an interior portion of the cell coverage area will be assigned an RB having a power level of $P_1$ or a RB having a power level of $P_2$ within the FFR portion of the spectrum.

Figure 16:
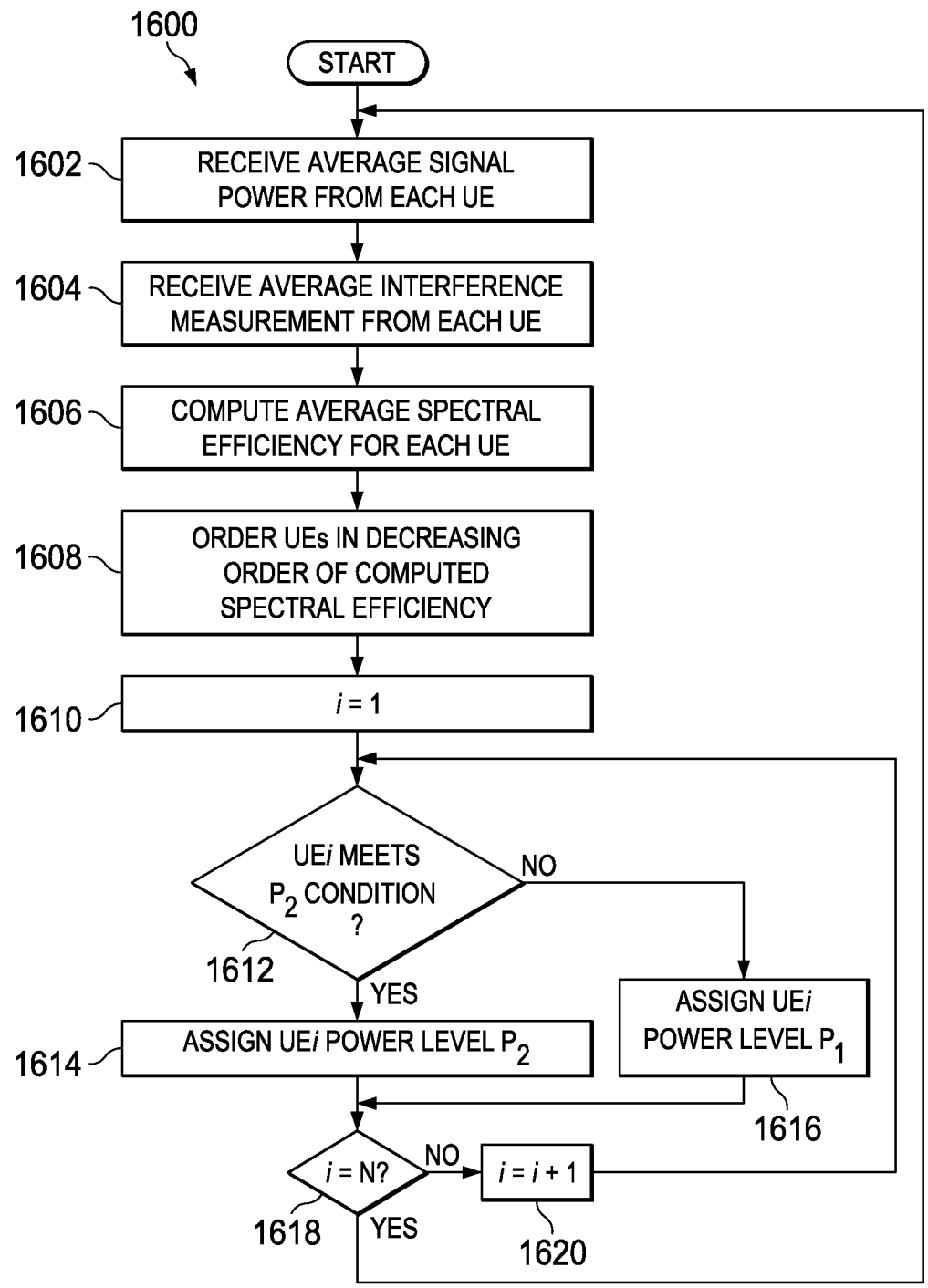
FIG. 16 illustrates a simplified flow diagram illustrating example operations associated with determining downlink transmission power levels for interior cell UEs in accordance with one embodiment.

Referring now to FIG. 16, FIG. 16 illustrates a simplified flow diagram 1600 illustrating example operations associated with determining downlink transmission power levels for interior cell UEs in accordance with one embodiment. In accordance with one or more embodiments of the flow 1600 of FIG. 16, cell interior UEs are served at a lower power and higher interference than all other UEs in the cell. In 1602, a cell 12 receives an indication of an average signal power on the downlink connection between the cell and a particular UE for each of N UEs connected to the cell. In 1604, the cell 12 receives an indication of an average interference measurement on the downlink connection between the cell and a particular UE for each UE connected to the cell. In 1606, the cell computes an average spectral efficiency for each UE based upon the average signal power and average interference. In a particular embodiment, the average spectral efficiency is computed as a function of the average signal power divided by the average interference for each cell. In one or more embodiments, the average spectral efficiency is a representative of an overall throughput performance of the UE.

In 1608, $UE_1 \ldots UE_N$ are ordered in decreasing order of the computed spectral efficiency for each UE. In 1610, an iterative procedure for determining downlink power levels for the UEs is initiated by setting an index value i equal to a value of 1. In 1612, the cell determines whether a particular $UE_i$ meets a condition for being assigned a power level of $P_2$. In one embodiment, the condition for $UE_i$ being assigned a power level $P_2$ is if the particular $UE_i$ receives a higher throughput rate when it shares resources with $UE_1, \ldots, UE_{i-1}$ with power level $P_2$ than when the $UE_i$ is scheduled on resources with power level $P_1$. In particular embodiments, equal resource/proportional fair scheduling of resources is used to maximize total throughput while at the same time allowing all users at least a minimal level of service. Further conditions for $UE_i$ being assigned a power level P2 may include if the reduction in utility of rates for $UE_1, \ldots, UE_{i-1}$ is less than the increase in utility of rate for $UE_i$, and $UE_1 \ldots UE_N$ have enough traffic to consume all RBs with power $P_1$.

If $UE_i$ meets the condition for being assigned power level $P_2$, the flow continues to 1614. In 1614, $UE_i$ is assigned power level $P_2$ and the flow continues to 1618. If $UE_i$ does not meet the condition for being assigned power level $P_2$, the flow continues to 1616. In 1616, $UE_i$ is assigned power level $P_1$ and the flow continues to 1618. In 1618, the cell determines whether the index value i=N. If the index value i is not equal to N, the flow continues to 1620 in which the index i is incremented by 1 (i=i+1). After 1620, the flow returns to 1612 in which the next UE is evaluated for determining whether it meets the condition to be assigned power level $P_2$. If the index value i is equal to N, the flow returns to 1602 such that the assignment of power levels for the interior UEs may be performed on a periodic basis in order to adapt to changing conditions within the network.

Figure 17:
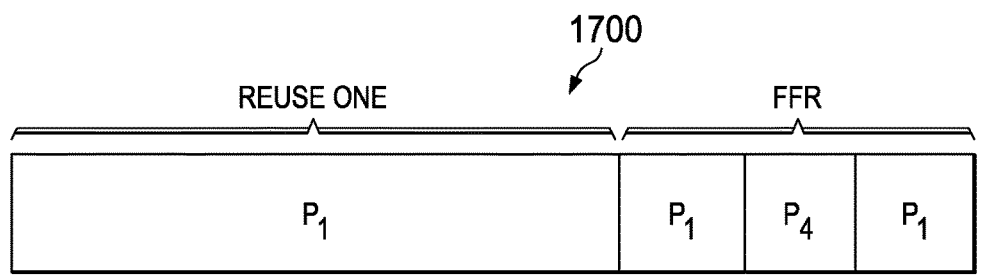
FIG. 17 is a simplified diagram of an example of resource block power allocation for cell edge UEs for the communication system of FIG. 1 in accordance with one embodiment.

FIG. 17 is a simplified diagram of an example of resource block power allocation 1700 for cell edge UEs for the communication system 10 of FIG. 1 in accordance with one embodiment. In the embodiment of FIG. 17, two different power levels ($P_1$, and $P_4$) for resource blocks (RBs) are illustrated in which $P_4 > P_1$ where $P_1$ and $P_4$ are power per RB (e.g., PSD). In the reuse one portion of the spectrum, one RB is illustrated in which $P_1$ is the power level used by cells. In the FFR portion of the spectrum, three RBs are illustrated in which two RBs have a power level of $P_1$ and one RB has a power level of $P_4$. In accordance with one or more embodiments, power level $P_1$ is kept fixed in the reuse one portion of the spectrum and a determination is made regarding wither a particular UE located at an edge portion of the cell coverage area will be assigned an RB having a power level of $P_4$ or a RB having a power level of $P_1$ within the FFR portion of the spectrum.

Figure 18:
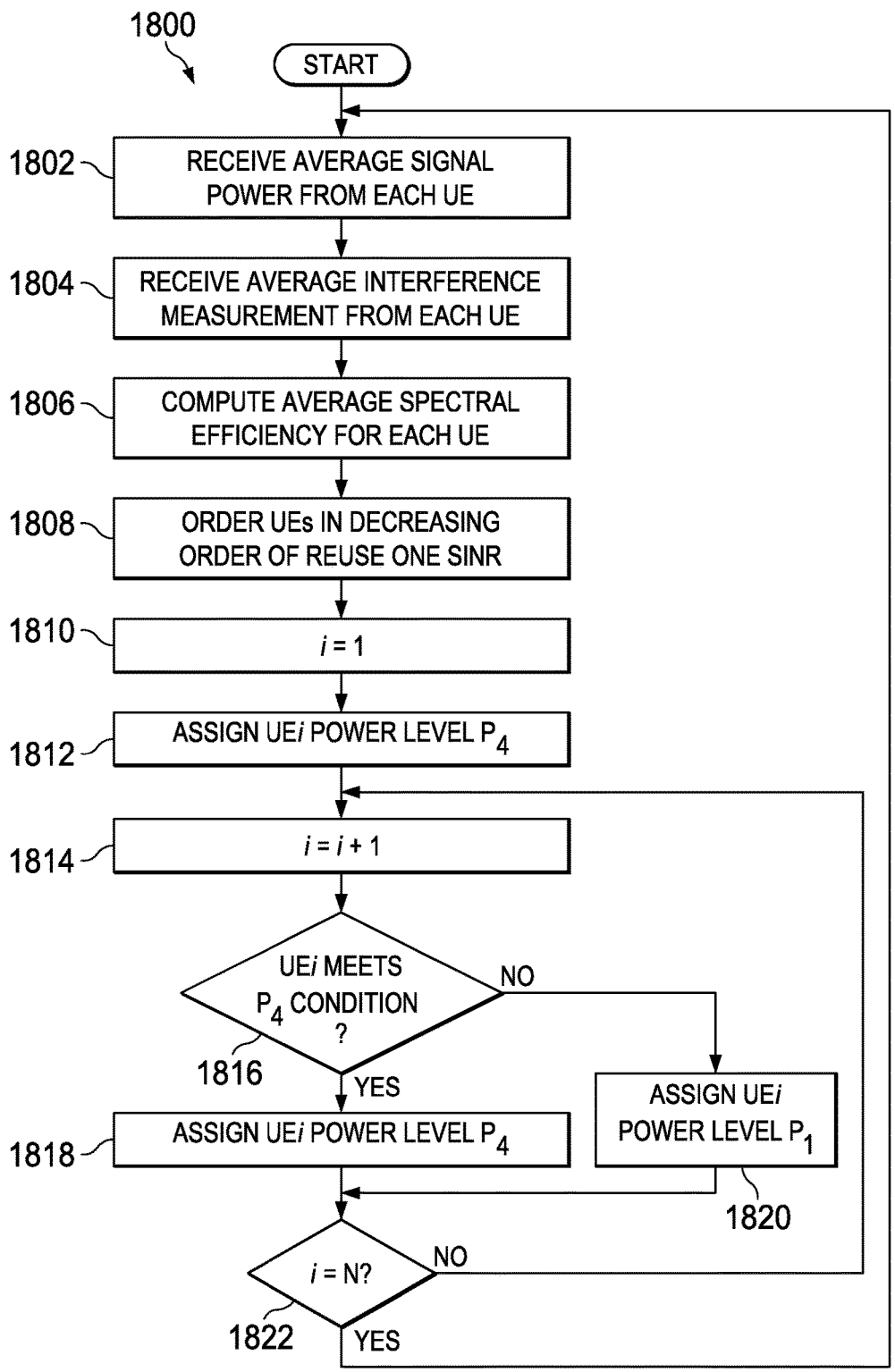
FIG. 18 illustrates a simplified flow diagram illustrating example operations associated with determining downlink transmission power levels for cell edge UEs in accordance with one embodiment.

Referring now to FIG. 18, FIG. 18 illustrates a simplified flow diagram 1800 illustrating example operations associated with determining downlink transmission power levels for cell edge UEs in accordance with one embodiment. In the embodiment of FIG. 18, the flow includes identifying cell edge UEs that have low tolerance to interference and involves a tradeoff between assigning a UE to an RB with higher SINR and giving a UE a larger number of RBs as RBs with higher SINR are limited. In accordance with one or more embodiments of the flow 1800 of FIG. 18, cell edge UEs are served at a higher power and lower interference than all other UEs in the cell. In 1802, a cell 12 receives an indication of the average of signal power on the downlink connection between the cell and a particular UE for each of N UEs connected to the cell. In 1804, the cell 12 receives an indication of an average interference measurement on the downlink connection between the cell and a particular UE for each UE connected to the cell. In a particular embodiment, the average interference measurement is a signal-to-interference-plus-noise ratio (SINR) measurement. In 1806, the cell computes an average spectral efficiency for each UE based upon the average signal power and average interference. In a particular embodiment, the average spectral efficiency is computed by dividing the average signal power by the average interference for each cell.

In 1808, $UE_1 \ldots UE_N$ are ordered in increasing order of the reuse one SINR. In particular embodiments, the reuse one SINR is the estimated SINR when all cells transmit at the same power per RB. In 1810, an iterative procedure for determining downlink power levels is initiated by setting an index value i equal to a value of 1. In 1812, $UE_1$ with the lowest SINR in reuse one is assigned power level $P_4$, with $P_4 > P_1$. In 1814, the index i is incremented by 1 (i=i+1). In 1816, the cell determines whether a particular $UE_i$ meets a condition for being assigned a power level of $P_4$. In one embodiment, the condition for $UE_i$ being assigned a power level $P_4$ is if the estimated rate when assigned all RBs with power level $P_4$ divided by i is greater than the average spectral efficiency on RBs with power $P_1$ multiplied by the total RBs with power $P_1$ divided by (N−i+1).

If $UE_i$ meets the condition for being assigned power level $P_4$, the flow continues to 1818. In 1818, $UE_i$ is assigned power level $P_4$ and the flow continues to 1822. If $UE_i$ does not meet the condition for being assigned power level $P_4$, the flow continues to 1820. In 1820, $UE_i$ is assigned power level $P_1$ and the flow continues to 1822. In 1822, the cell determines whether the index value i=N. If the index value i is not equal to N, the flow returns to 1814 in which the index i is incremented by 1 (i=i+1). After 1814, the flow returns to 1816 in which the next UE is evaluated for determining whether it meets the condition to be assigned power level $P_4$. If the index value i is equal to N, the flow returns to 1802 such that the assignment of power levels for the cell edge UEs may be performed on a periodic basis in order to adapt to changing conditions within the network.

Although the embodiments described in FIGS. 15-18 are described with respect to two possible power levels for a particular UE, in other embodiments the principles described herein may be applied to more than two power levels. In accordance with one embodiment in which multiple power levels are available for a UE, a procedure for assigning power levels may include beginning with an RB/power level corresponding to highest SINR. Assuming that frequency bands/RBs are ordered as a function of SINR (e.g., based on RSRP computations and not accounting for frequency selective fading) is the same for all UEs, the procedure described in FIG. 18 may be applied for this frequency band assuming that RBs with lower SINR are equally distributed among all UEs. The procedure may then be repeated for the next highest power level to fix the allocation of UEs to a power level. The process may then be repeated until all available power levels have been assigned.

In accordance with one or more embodiments, the principles described herein may be used for UE transmission power level adaptation in order adapt the power allocation to UEs due to UE mobility. In particular embodiments, a hysteresis effect can be used in order to avoid frequency changes in power levels such that one or more UEs' power levels are changed only if in addition to the criterion described above, the average throughput in the cell improves by a predetermined percentage (e.g., five percent (5%)) if such a power level is performed.

Figure 19:
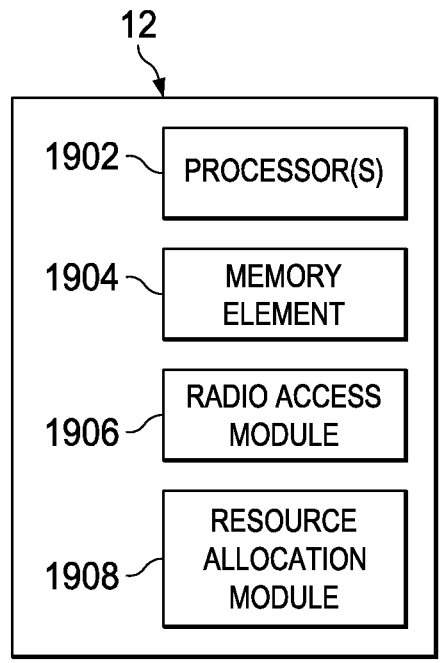
FIG. 19 illustrates an embodiment of a cell of the communication system of FIG. 1.

Referring now to FIG. 19, FIG. 19 illustrates an embodiment of a cell 12a-12c of communication system 10 of FIG. 1. Cell 12a-12c includes one or more processor(s) 1902, a memory element 1904, a radio access module 1906, and a resource allocation module 1908. Processor(s) 1902 is configured to execute various tasks of cell 12a-12c as described herein and memory element 1904 is configured to store data associated with cell 12a-12c. Radio access module 506 is configured to wirelessly communication with one or more of UEs 16a-16f. Resource allocation module 1908 is configured to perform the operations associated with determining allocation of network resources to UEs 16a-16f as described herein.

Figure 20:
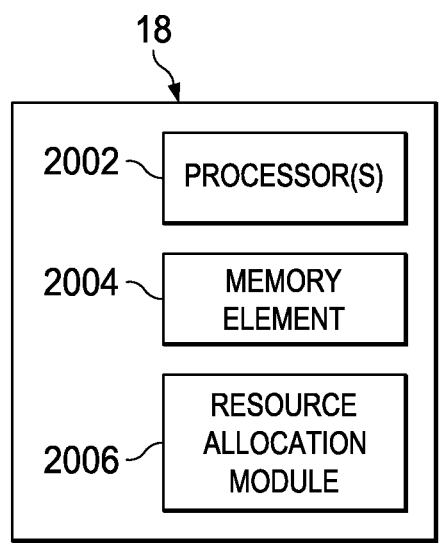
FIG. 20 illustrates an embodiment of a server of the communication system of FIG. 1.

Referring now to FIG. 20, FIG. 20 illustrates an embodiment of server 18 of communication system 10 of FIG. 1. Server 18 includes one or more processor(s) 2002, a memory element 2004, and a resource allocation module 2006. Processor(s) 2002 is configured to execute various tasks of server 18 as described herein and memory element 2004 is configured to store data associated with server 18. Resource allocation module 2006 is configured to perform the operations associated with determining allocation of network resources to cells 12a-12c and/or UEs 16a-16f as described herein.

In regards to the internal structure associated with communication system 10 and communication system 1100, each of UEs 16a-16f, cells 12a-12c, and server 18 can include memory elements for storing information to be used in achieving the operations, as outlined herein. Additionally, each of these devices may include a processor that can execute software or an algorithm to perform the activities as discussed in this Specification. These devices may further keep information in any suitable memory element [random access memory (RAM), read only memory (ROM), an erasable programmable read only memory (EPROM), an electrically erasable programmable ROM (EEPROM), etc.], software, hardware, or in any other suitable component, device, element, or object where appropriate and based on particular needs. Any of the memory items discussed herein should be construed as being encompassed within the broad term 'memory element.' The information being tracked or sent to UEs 16*a*-16*f,* cells 12*a*-12*c,* and server 18 could be provided in any database, register, control list, cache, or storage structure: all of which can be referenced at any suitable timeframe. Any such storage options may be included within the broad term 'memory element' as used herein in this Specification. Similarly, any of the potential processing elements, modules, and machines described in this Specification should be construed as being encompassed within the broad term 'processor.' Each of the network elements and mobile nodes can also include suitable interfaces for receiving, transmitting, and/or otherwise communicating data or information in a network environment.

Note that in certain example implementations, the resource allocation functions outlined herein may be implemented by logic encoded in one or more tangible media, which may be inclusive of non-transitory media (e.g., embedded logic provided in an application specific integrated circuit [ASIC], digital signal processor [DSP] instructions, software [potentially inclusive of object code and source code] to be executed by a processor, or other similar machine, etc.). In some of these instances, memory elements can store data used for the operations described herein. This includes the memory elements being able to store software, logic, code, or processor instructions that are executed to carry out the activities described in this Specification. A processor can execute any type of instructions associated with the data to achieve the operations detailed herein in this Specification. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array [FPGA], an EPROM, an EEPROM) or an ASIC that includes digital logic, software, code, electronic instructions, or any suitable combination thereof.

Note that with the examples provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and further can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the previously described activities illustrate only some of the possible signaling scenarios and patterns that may be executed by, or within, communication system 10 and/or communication system 1100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 10 and/or communication system 1100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access, and signaling protocols, communication system 10 and/or communication system 1100 may be applicable to other exchanges, routing protocols, or routed protocols in which in order to provide hand-in access to a network. Moreover, although communication system 10 and communication system 1100 have been illustrated with reference to particular elements and operations that facilitate the communication process, these elements and operations may be replaced by any suitable architecture or process that achieves the intended functionality of communication system 10 and/or communication system 1100.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:

receiving, at a server that is communicatively coupled with a plurality of cells, a plurality of performance metrics from the plurality of cells, the plurality of performance metrics comprising:

a first performance metric representing an overall throughput performance of all user equipment devices associated with a first cell of the plurality of cells, when the first cell is potentially allocated a first resource allocation value for a fractional frequency reuse portion of the first cell's frequency spectrum; and a second performance metric representing an overall throughput performance of all user equipment devices associated with the first cell when the first cell is potentially allocated a second resource allocation value, different from the first resource allocation value, for the fractional frequency reuse portion of the first cell's frequency spectrum;

determining, at the server, a fraction of resources for allocation within the fractional frequency reuse portion of the frequency spectrum for each of the plurality of cells, based upon the received first and second performance metrics, wherein the plurality of cells includes the first cell and a second cell and wherein the first cell does not neighbor the second cell;

determining, for each of the plurality of cells, a fraction of the resources for allocation within a reuse one portion of the frequency spectrum based upon the determined fraction of resources for allocation within the fractional frequency reuse portion of the frequency spectrum for the respective cell; and transmitting, from the server to each of the plurality of cells, the fraction of resources for allocation within the fractional frequency reuse portion of the frequency spectrum for the respective cell.

2. The method of claim 1 further comprising:

transmitting, from the server, resource allocation parameters including an indication of the fraction of resources for allocation within the reuse one portion of the frequency spectrum to each of the plurality of cells.

3. The method of claim 1, wherein determining the fraction of resources for allocation within the fractional frequency reuse portion of the spectrum includes maximizing a sum of utilities across the plurality of cells.

4. The method of claim 3, wherein maximizing the sum of utilities includes solving a utility maximization resource allocation function across the plurality of cells to determine the fraction of resources for allocation within the fractional frequency reuse portion of a frequency spectrum and the fraction of the resources for allocation within the reuse one portion of the frequency spectrum.

5. The method of claim 1, wherein the performance metric includes at least one of a spectral efficiency and average modulation and coding scheme (MCS) for each user equipment device associated with a cell.

6. The method of claim 5, wherein determining the fraction of resources for allocation within the fractional frequency reuse portion of the frequency spectrum includes solving a utility maximization resource allocation function across the plurality of cells using at least one of the spectral efficiency and average modulation and coding scheme (MCS).

7. The method of claim 1, wherein the performance metric includes an effective rate computed by the particular cell based upon performance metrics received from each user equipment device associated with the cell.

8. The method of claim 1, wherein the performance metric includes a number of user equipment devices served by the particular cell that have a performance measure metric in the reuse one portion of the frequency spectrum below a target threshold value, and a total number of user equipment devices served by the particular cell.

9. The method of claim 8, wherein determining the fraction of resources for allocation within the fractional frequency reuse portion of the frequency spectrum includes adapting the fraction of resources such that a predefined percentile of downlink transmission to the UEs occur at a predefined performance metric threshold.

10. The method of claim 8, wherein the performance measure metric includes at least one of a signal-to-interference-plus-noise ratio (SINR) and average modulation and coding scheme (MCS).

11. One or more non-transitory tangible media that includes code for execution and when executed by a processor operable to perform operations comprising:

receiving, at a server that is communicatively coupled with a plurality of cells, a plurality of performance metrics from the plurality of cells, the plurality of performance metrics comprising:

a first performance metric representing an overall throughput performance of all user equipment devices associated with a first cell of the plurality of cells, when the first cell is potentially allocated a first resource allocation value for a fractional frequency reuse portion of the first cell's frequency spectrum; and a second performance metric representing an overall throughput performance of all user equipment devices associated with the first cell when the first cell is potentially allocated a second resource allocation value, different from the first resource allocation value, for the fractional frequency reuse portion of the first cell's frequency spectrum;

determining, at the server, a fraction of resources for allocation within the fractional frequency reuse portion of the frequency spectrum for each of the plurality of cells, based upon the received first and second performance metrics, wherein the plurality of cells includes the first cell and a second cell and wherein the first cell does not neighbor the second cell;

determining, for each of the plurality of cells, a fraction of the resources for allocation within a reuse one portion of the frequency spectrum based upon the determined fraction of resources for allocation within the fractional frequency reuse portion of the frequency spectrum for the respective cell; and transmitting, from the server to each of the plurality of cells, the fraction of resources for allocation within the fractional frequency reuse portion of the frequency spectrum for the respective cell.

12. The media of claim 11, wherein the operations further comprise:

transmitting, from the server, resource allocation parameters including an indication of the fraction of resources for allocation within the reuse one portion of the frequency spectrum to each of the plurality of cells.

13. The media of claim 11, wherein determining the fraction of resources for allocation within the fractional frequency reuse portion of the spectrum includes maximizing a sum of utilities across the plurality of cells.

14. The media of claim 13, wherein maximizing the sum of utilities includes solving a utility maximization resource allocation function across the plurality of cells to determine the fraction of resources for allocation within the fractional frequency reuse portion of a frequency spectrum and the fraction of the resources for allocation within the reuse one portion of the frequency spectrum.

15. The media of claim 11, wherein the performance metric includes at least one of a spectral efficiency and average modulation and coding scheme (MCS) for each user equipment device associated with a cell.

16. The media of claim 11, wherein the performance metric includes an effective rate computed by the particular cell based upon performance metrics received from each user equipment device associated with the cell.

17. An apparatus, comprising:

a memory element configured to store data, a processor operable to execute instructions associated with the data, and at least one module being configured to:

receive, at a server that is communicatively coupled with a plurality of cells, a plurality of performance metrics from the plurality of cells, the plurality of performance metrics comprising:

a first performance metric representing an overall throughput performance of all user equipment devices associated with a first cell of the plurality of cells, when the first cell is potentially allocated a first resource allocation value for a fractional frequency reuse portion of the first cell's frequency spectrum; and a second performance metric representing an overall throughput performance of all user equipment devices associated with the first cell when the first cell is potentially allocated a second resource allocation value, different from the first resource allocation value, for the fractional frequency reuse portion of the first cell's frequency spectrum;

determine, at the server, a fraction of resources for allocation within the fractional frequency reuse portion of the frequency spectrum for each of the plurality of cells, based upon the received first and second performance metrics, wherein the plurality of cells includes the first cell and a second cell and wherein the first cell does not neighbor the second cell;

determine a fraction of the resources for allocation within a reuse one portion of the frequency spectrum based upon the determined fraction of resources for allocation within the fractional frequency reuse portion of the frequency spectrum; and transmit, from the server to each of the plurality of cells, the fraction of resources for allocation within the fractional frequency reuse portion of the frequency spectrum for the respective cell.

18. The apparatus of claim 17, wherein the at least one module is further configured to:

transmit, from the server, resource allocation parameters including an indication of the fraction of resources for allocation within the reuse one portion of the frequency spectrum to each of the plurality of cells.

* * * * *

UNITED STATES PATENT AND TRADEMARK OFFICE
CERTIFICATE OF CORRECTION

PATENT NO. : 10,154,415 B2
APPLICATION NO. : 14/818084
DATED : December 11, 2018
INVENTOR(S) : Ritesh K. Madan et al.

It is certified that error appears in the above-identified patent and that said Letters Patent is hereby corrected as shown below:

In the Specification

In Column 7, Line 53, delete "$P_{edge}$" and insert -- $\rho_{edge}$ --, therefor.

In Column 10, Line 53, delete "feed back" and insert -- feedback --, therefor.

In Column 13, Line 35, delete "N'," and insert -- $N^{max}$, --, therefor.

In Column 15, Line 12, delete "that that" and insert -- that --, therefor.

In Column 17, Line 51, delete "$P_b$," and insert -- $P_1$, --, therefor.

Signed and Sealed this
Fifth Day of March, 2019

Andrei Iancu
*Director of the United States Patent and Trademark Office*